(12) United States Patent
Dietrich et al.

(10) Patent No.: US 9,626,451 B2
(45) Date of Patent: **\*Apr. 18, 2017**

(54) CANONICAL DATA MODEL FOR ITERATIVE EFFORT REDUCTION IN BUSINESS-TO-BUSINESS SCHEMA INTEGRATION

(71) Applicant: SAP SE, Walldorf (DE)

(72) Inventors: Michael Dietrich, Karlsruhe (DE); Jens Lemcke, Karlsruhe (DE); Gunther Stuhec, Heidelberg (DE)

(73) Assignee: SAP SE, Walldorf (DE)

( \* ) Notice: Subject to any disclaimer, the term of this patent is extended or adjusted under 35 U.S.C. 154(b) by 0 days.

This patent is subject to a terminal disclaimer.

(21) Appl. No.: 15/056,346

(22) Filed: Feb. 29, 2016

(65) Prior Publication Data

US 2016/0179982 A1    Jun. 23, 2016

Related U.S. Application Data

(63) Continuation of application No. 13/948,391, filed on Jul. 23, 2013, now Pat. No. 9,311,429.

(51) Int. Cl.
*G06F 17/30* (2006.01)
*G06Q 10/06* (2012.01)

(52) U.S. Cl.
CPC .. *G06F 17/30958* (2013.01); *G06F 17/30557* (2013.01); *G06F 17/30589* (2013.01); *G06Q 10/067* (2013.01)

(58) Field of Classification Search
CPC ......... G06F 17/30557; G06F 17/30589; G06F 17/30958; G06Q 10/067
See application file for complete search history.

(56) References Cited

U.S. PATENT DOCUMENTS 6,826,568 B2    11/2004    Bernstein et al.
7,543,266 B2    6/2009    Brown, Jr.
(Continued)

OTHER PUBLICATIONS

U.S. Appl. No. 13/368,845, filed Feb. 8, 2012, Jens Lemcke et al.
(Continued)

*Primary Examiner* — Richard Bowen
(74) *Attorney, Agent, or Firm* — Fish & Richardson P.C.

(57) ABSTRACT

The present disclosure describes methods, systems, and computer program products for providing and maintaining an evolving canonical data model (CDM) which consolidates current knowledge of the correspondences of existing schemas. One computer-implemented method includes receiving the plurality of source hierarchical schemas, each source hierarchical schema being stored as a computer-readable document in computer-readable memory, processing, using a computer, the source hierarchical schemas to generate a merged graph, the merged graph comprising a plurality of merged nodes, each merged node being provided based on one or more nodes from at least two of the source hierarchical schemas, and determining, using the computer, that the merged graph includes one or more conflicts and, in response, resolving each conflict of the one or more conflicts to generate a computed-transitive-edge-free, conflict-free merged graph as a unified data model (UDM), wherein resolving comprises splitting one or more merged nodes into respective sub-sets of merged nodes.

24 Claims, 10 Drawing Sheets

(56) References Cited

U.S. PATENT DOCUMENTS

| | | | |
|---|---|---|---|
| 7,624,113 B2 | 11/2009 | Stuhec | |
| 7,711,676 B2 | 5/2010 | Stuhec | |
| 7,716,164 B2 | 5/2010 | Stuhec | |
| 7,716,255 B2 | 5/2010 | Stuhec | |
| 7,818,342 B2 | 10/2010 | Stuhec | |
| 7,836,392 B2 | 11/2010 | Stuhec et al. | |
| 7,856,597 B2 | 12/2010 | Stuhec | |
| 7,865,519 B2 | 1/2011 | Stuhec | |
| 7,958,074 B2 * | 6/2011 | Uceda-Sosa | G06N 5/003 706/45 |
| 8,032,828 B2 | 10/2011 | Su et al. | |
| 8,041,746 B2 | 10/2011 | Stuhec | |
| 8,078,568 B2 | 12/2011 | Stuhec et al. | |
| 8,086,646 B2 | 12/2011 | Stuhec et al. | |
| 8,087,030 B2 | 12/2011 | Stuhec et al. | |
| 8,150,883 B2 | 4/2012 | Stuhec | |
| 8,271,503 B2 | 9/2012 | Glaenzer et al. | |
| 8,280,755 B2 | 10/2012 | Stuhec et al. | |
| 8,307,027 B2 | 11/2012 | Stuhec et al. | |
| 8,548,938 B2 * | 10/2013 | Amaru | G06F 17/30557 707/603 |
| 2005/0149552 A1 | 7/2005 | Chan et al. | |
| 2005/0278139 A1 | 12/2005 | Glaenzer et al. | |
| 2006/0074901 A1 | 4/2006 | Pirahesh et al. | |
| 2006/0080338 A1 | 4/2006 | Seubert et al. | |
| 2006/0085336 A1 | 4/2006 | Seubert et al. | |
| 2006/0085450 A1 | 4/2006 | Seubert et al. | |
| 2006/0136489 A1 | 6/2006 | Thome et al. | |
| 2006/0143057 A1 | 6/2006 | Sadiq | |
| 2007/0239435 A1 | 10/2007 | Stuhec | |
| 2008/0021912 A1 | 1/2008 | Seligman et al. | |
| 2008/0243772 A1 * | 10/2008 | Fuxman | G06F 17/2264 |
| 2010/0049728 A1 | 2/2010 | Chiticariu et al. | |
| 2011/0246530 A1 | 10/2011 | Malafsky | |
| 2013/0091184 A1 | 4/2013 | Alexe et al. | |
| 2013/0204909 A1 | 8/2013 | Lemcke et al. | |
| 2013/0246480 A1 | 9/2013 | Lemcke et al. | |

OTHER PUBLICATIONS

U.S. Appl. No. 13/423,471, filed Mar. 19, 2012, Jens Lemcke et al.
U.S. Appl. No. 13/447,419, filed Apr. 16, 2012, Jens Lemcke et al.
U.S. Appl. No. 13/567,544, filed Aug. 6, 2012, Jens Lemcke et al.
U.S. Appl. No. 13/875,539, filed May 2, 2013, Jens Lemcke et al.
U.S. Appl. No. 13/887,453, filed May 6, 2013, Jens Lemcke et al.
Communication from EPO dated Oct. 27, 2014; including European Search Report; 5 pages.
Statement in Accordance with the Notice from the European Patent Office Dated Oct. 1, 2007 concerning Business Methods—EPC, 2 pages.

* cited by examiner

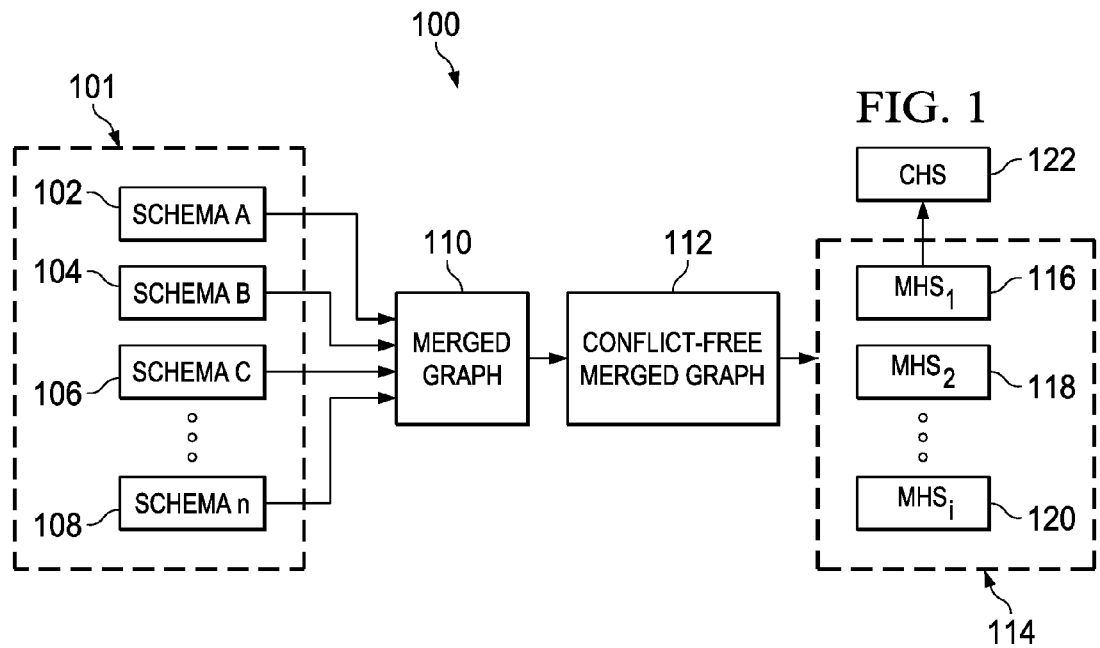
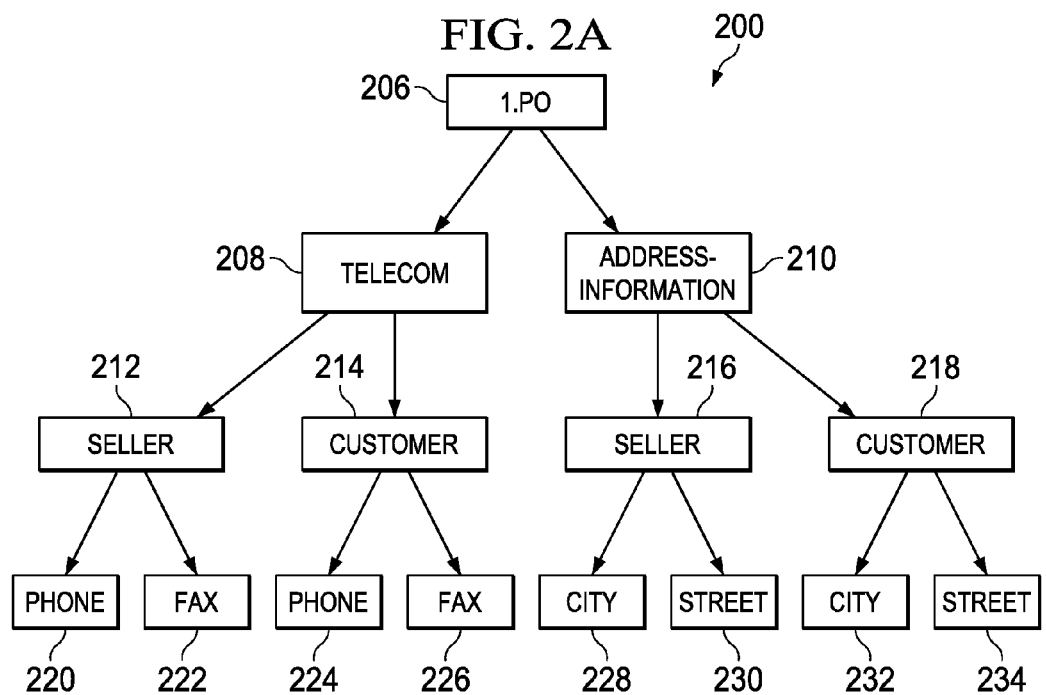

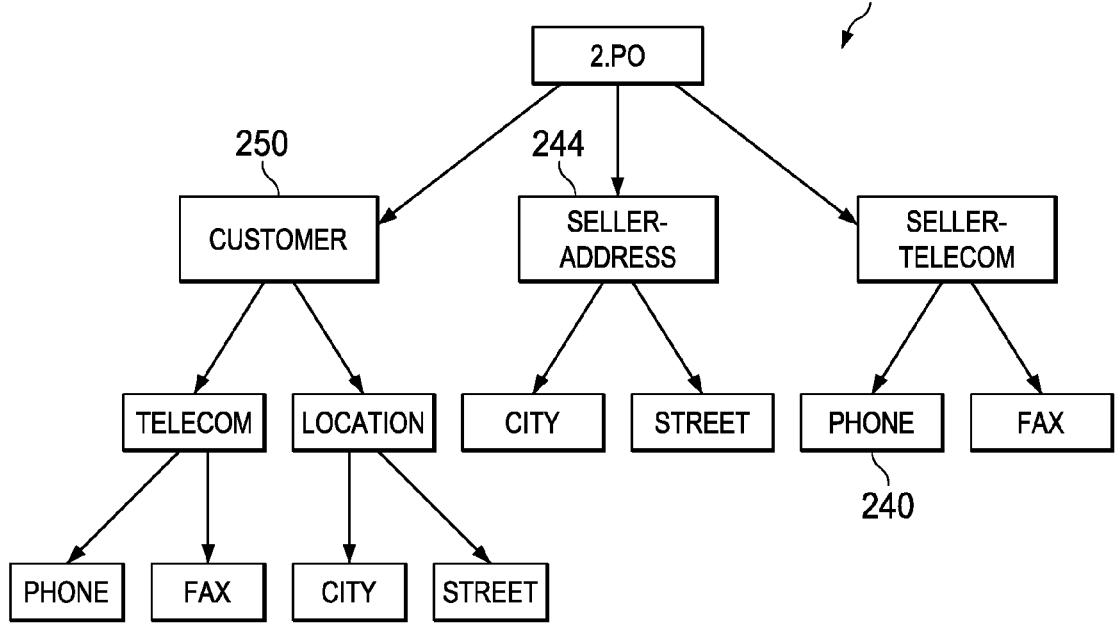
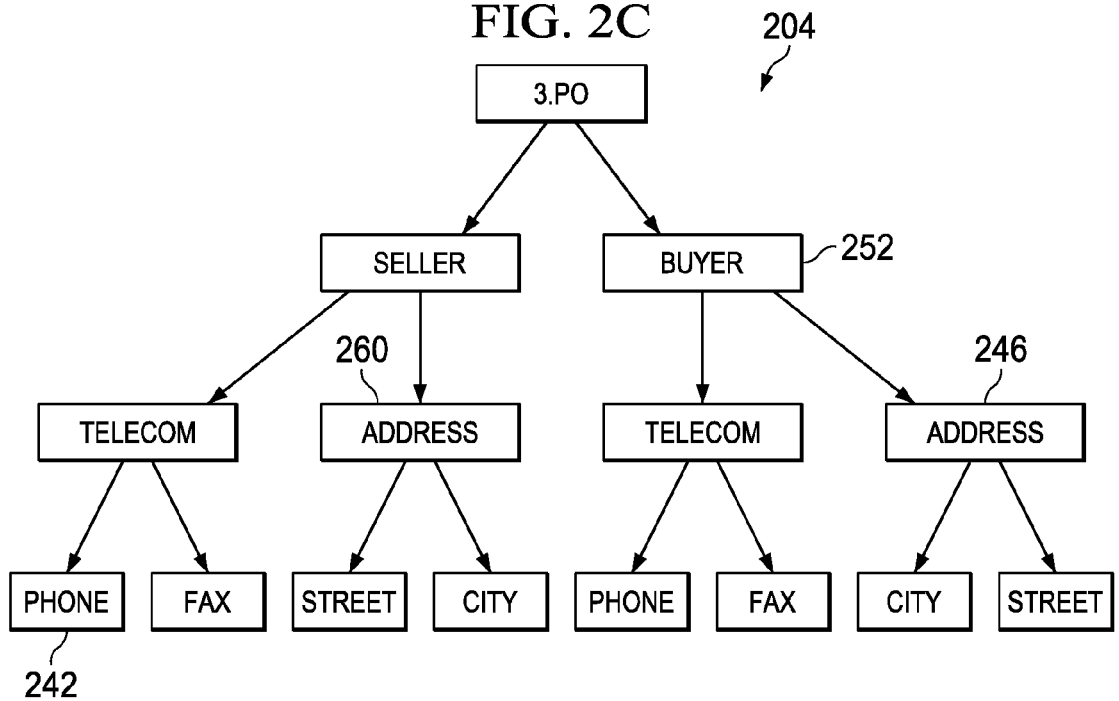

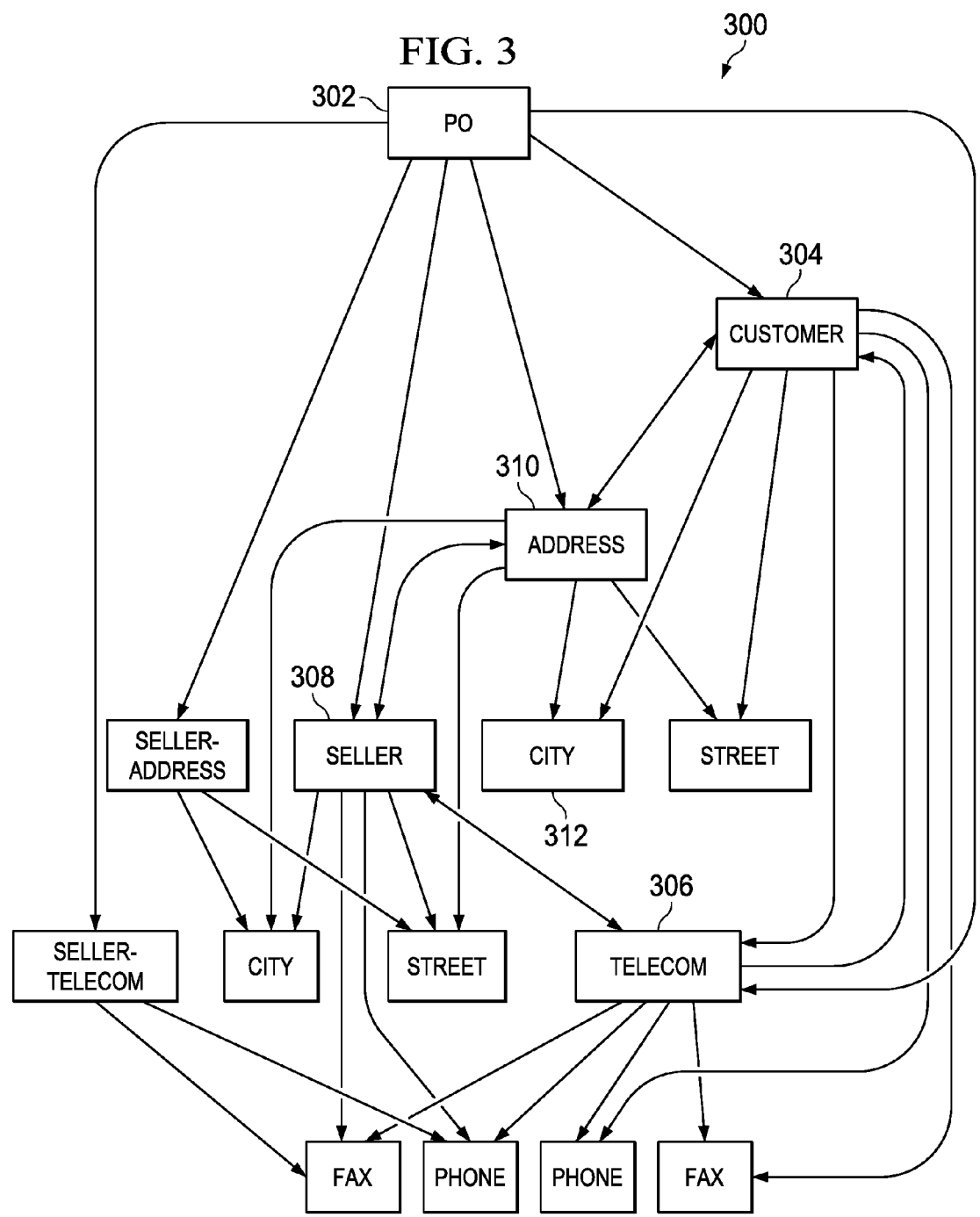

CANONICAL DATA MODEL FOR ITERATIVE EFFORT REDUCTION IN BUSINESS-TO-BUSINESS SCHEMA INTEGRATION

CLAIM OF PRIORITY

This application claims priority under 35 USC §120 to U.S. patent application Ser. No. 13/948,391, filed on Jul. 23, 2013, the entire contents of which are hereby incorporated by reference.

RELATED APPLICATIONS

This application is related to U.S. patent application Ser. No. 13/423,471, filed on Mar. 19, 2012. The entire contents of U.S. patent application Ser. No. 13/423,471 are hereby incorporated by reference

BACKGROUND

An enterprise can include multiple business processes that are embodied in respective information technology (IT) applications. In some instances, the applications include diverse business data interfaces, schemas and data models with respect to one another. Application integration can include the integration of systems and applications across an enterprise and/or between different enterprises (business-to-business (B2B) integration). The diversity and heterogeneity of business data interfaces, schemas and data models across applications desired to be integrated hinders integration and is one of the key drivers of integration costs, making up a significant portion of enterprise IT budgets.

SUMMARY

Implementations of the present disclosure include computer-implemented methods for providing and maintaining an evolving canonical data model (CDM) which consolidates current knowledge of the correspondences of existing schemas. One computer-implemented method includes receiving the plurality of source hierarchical schemas, each source hierarchical schema being stored as a computer-readable document in computer-readable memory, processing, using a computer, the source hierarchical schemas to generate a merged graph, the merged graph comprising a plurality of merged nodes, each merged node being provided based on one or more nodes from at least two of the source hierarchical schemas, and determining, using the computer, that the merged graph includes one or more conflicts and, in response, resolving each conflict of the one or more conflicts to generate a computed-transitive-edge-free, conflict-free merged graph as a unified data model (UDM), wherein resolving comprises splitting one or more merged nodes into respective sub-sets of merged nodes.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, further comprising applying a relevance rating to the UDM to generate a canonical data model (CDM).

A second aspect, combinable with any of the previous aspects, further comprising applying context logic to the CDM to generate a domain-specific CDM view.

A third aspect, combinable with any of the previous aspects, further comprising deriving a message guide from the domain-specific CDM view.

A fourth aspect, combinable with any of the previous aspects, further comprising storing the derived message guide into the UDM.

A fifth aspect, combinable with any of the previous aspects, further comprising applying transitive mappings to the UDM to generate a mapping proposal.

A sixth aspect, combinable with any of the previous aspects, further comprising deriving a mapping from the generated mapping proposal.

A seventh aspect, combinable with any of the previous aspects, further comprising storing the derived mapping into the UDM.

The subject matter described in this specification can be implemented in particular implementations so as to realize one or more of the following advantages. First, a unified data model (UDM) is used to create a CDM as a single view of data for multi-enterprises, enterprises, divisions, or processes and can be independently used by any system or partner. Second, cross domain as well as cross standards unification is covered. Third, an evolving canonical CDM is maintained which consolidates the current knowledge of the correspondences of existing schemas. Fourth, various features address challenges in contemporary business-to-business (B2B) integration: 1) relevance rating—since existing all-purpose standards are underspecified into broad, relevant fields are identified or a new message guide; 2) context logic—since requirements vary greatly from business domain to business domain, best practices are analyzed and proposed for specific business domains; 3) transitive mappings—the CDM relates all schemas to each other and thus knowledge of transitive mappings is inherent; 4) cross-standard integration—the CDM inherently combines the features of the plethora of smaller, domain specific standards, which today make it difficult to enter new business areas across multiple domains; and 5) iterative improvement—by knowing and proposing yields productively used by other companies, the CDM facilitates reuse of existing schema structures. With that, the CDM iteratively reduces heterogeneity of the schemas and with that also the mapping effort. Fifth, by using the CDM in combination with the above-mentioned features, at least two appealing properties are revealed: 1) every participant realizes an effort reduction, 2) companies are not forced to a given standard. Instead, guidance is provided allows deviating where necessary. The negative effects of flexibility are absorbed by the relevance rating and transitive mapping. Other advantages will be apparent to those skilled in the art.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 is a functional block diagram depicting example processes for generating a canonical hierarchical schema (CHS).

FIGS. 2A-2C depict respective example hierarchical schemas.

FIG. 3 depicts an example merged graph based on the example hierarchical schemas of FIGS. 2A-2C.

Like reference numbers and designations in the various drawings indicate like elements.

DETAILED DESCRIPTION

Figure 4A:
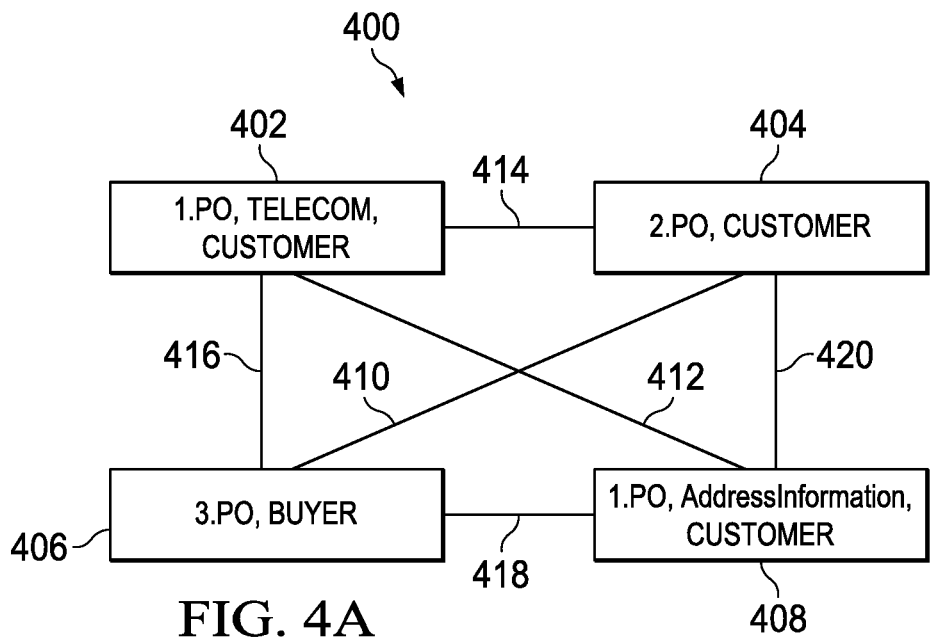
FIGS. 4A and 4B depicts example splitting of an equivalence class.

This disclosure generally describes computer-implemented methods, computer-program products, and systems for maintaining an evolving canonical data model (CDM). The following description is presented to enable any person skilled in the art to practice the disclosed subject matter, and is provided in the context of one or more particular implementations. Various modifications to the disclosed implementations can be made, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Implementations of the present disclosure are generally directed to generating a canonical data model, including a canonical hierarchical schema (CHS), from a set of disparate, hierarchical schemas. In some examples, a canonical data model provides a pattern for enterprise application integration. In some implementations, a merged graph is generated based on the plurality of hierarchical schemas in the set of hierarchical schemas, and any conflicts within the merged graph are resolved to generate a conflict-free merged graph. Multiple mediated hierarchical schemas (MHSs) are generated based on the conflict-free merged graph. The CHS is determined based on the plurality of MHSs. In some examples, the CHS can be used to integrate a plurality of applications, each application corresponding to a hierarchical schema in the plurality of hierarchical schemas.

FIG. 1 is a functional block diagram depicting example processes for generating a CHS. A set of hierarchical schemas 101 includes a plurality of hierarchical schemas. In the depicted example, the hierarchical schemas include Schema A, Schema B, Schema C, . . . Schema n (102, 104, 106, 108, respectively). In some examples, each schema is specific to a particular computer program application that is executed using one or more processors, and is different from the other hierarchical schemas in the set of hierarchical schemas 101. In some examples, each of the hierarchical schemas 102, 104, 106, 108 can be provided as a document that can be stored in computer-readable memory. Example documents can include documents provided using schema description languages. Example schema description languages can include XSD (XML Schema Definition), DTD (document type definition), DSD (Document Structure Description), XDR (XML-Data Reduced (XDR)) and others.

The set of hierarchical schemas 101 is processed to generate a merged graph 110. In some examples, the merged graph 110 can be provided as a non-tree structure, cyclic graph and can include conflicts between the hierarchical schemas. The merged graph 110 and/or portions thereof can be processed to resolve any conflicts and to generate a conflict-free merged graph 112. In some examples, the conflict-free merged graph 112 can be provided as a non-tree structure, acyclic graph. The conflict-free merged graph 112 is processed to generate a set of MHSs 114. In some examples, a set of MHSs can include one or more MHSs. In the depicted example, the set of MHSs 114 includes $MHS_1$, $MHS_2$, . . . , $MHS_i$ (116, 118, 120, respectively). The set of MHSs 114 is processed to provide a CHS 122.

Implementations of the present disclosure will be discussed in further detail below with reference to FIG. 1.

FIGS. 2A-2C depict respective example hierarchical schemas 200, 202, 204. By way of non-limiting example, the hierarchical schemas 200, 202, 204 correspond to information that can be provided in a purchase order (PO). Each of the hierarchical schemas 200, 202, 204 defines the organization of information contained in a PO.

Each of the hierarchical schemas 200, 202, 204 is provided as a tree structure that includes nodes and edges between nodes. In some examples, the nodes of a hierarchical schema include a root node, intermediate nodes and leaf nodes. Using the hierarchical schema 200 as a non-limiting example, the hierarchical schema 200 includes a root node 206, intermediate nodes 208, 201, 212, 214, 216, 218 and leaf nodes 220, 222, 224, 226, 228, 230, 232, 234. In some examples, root nodes and intermediate nodes include labels, and leaf nodes include fields having data therein. In a hierarchical schema having a tree structure, nodes can include parent nodes and children nodes, where each parent node includes one or more child nodes (as indicated by edges between nodes) and each child node includes only one parent node (as indicated by an edge between nodes). Again using the hierarchical schema as an example, the intermediate node 212 is the parent node of the leaf nodes 220, 222 (i.e., child nodes), and the intermediate node 208 is the parent node of the intermediate nodes 212, 214 (i.e., child nodes). In this manner, a root node is a parent node, an intermediate node can be both a parent node and a child node, and a leaf node can be a child node if the tree is not malformed, i.e. consists of more than a single node.

In view of the discussion above, a hierarchical schema is provided as a tree of properties P, where each hierarchical schema can be spanned by a partial function (e.g., parent: P→P) that provides the parent to each property. The set of all leaf nodes/properties is a subset of the set of all nodes/properties (e.g., $L \subseteq P$). In some examples, multiple schemas can appear in a graph spanned by the function parent as unique connected components. The undirected reachability relation of the graph can be provided as an equivalence relation S, where two properties belonging to the same schema can be denoted as $p_1 \sim_S p_2$ (e.g., instead of $(p_1, p_2) \in S$) (where the operator "~" denotes an equivalence relationship). The set of all nodes belonging to the same schema as the property $p_1$ can be denoted as $S_1 = [p_1]$, where $S_1$ denotes a specific hierarchical schema. The set of all schemas can be denoted as $P/\sim$. We can add a subscript as in $\sim_s$, $[p_1]_s$, and $P/\sim_s$ to distinguish the equivalence operator, the equivalence class, and the set of all equivalence classes belonging to equivalence relation S from other equivalence relations.

In accordance with implementations of the present disclosure, field mappings and semantic correspondences between nodes across multiple schemas can be provided. In some examples, field mappings indicate a correspondence between leaf nodes across multiple schemas and semantic correspondences indicate a correspondence between intermediate nodes across the multiple schemas. In some examples, the provided field mappings are a subset of all tuples that can be generated from the leaf nodes of the hierarchical schemas and can be denoted as $M \subseteq L \times L$. In some examples, the provided semantic correspondences can be denoted as $C \subseteq P\backslash L \times P\backslash L$ (where the operator "\" denotes "without"). The distinction between field mappings and semantic correspondences is logical because a field (i.e., a leaf node) carries a value whereas an intermediate node structures fields, and is realistic because a field mapping translates only field values to field values.

In some examples, the field mappings are provided as two-way field mappings. Referring again to FIGS. 2A-2C, and by way of non-limiting example, a first field mapping between the hierarchical schemas 200, 202 and a second field mapping between the hierarchical schemas 200, 204 can be provided. The first field mapping can define two-way correspondences between the leaf nodes of the hierarchical schema 200 and the leaf nodes of the hierarchical schema 202. For example, the leaf node 220 of the hierarchical schema 200 can correspond to a leaf node 240 of the hierarchical schema 202, and the leaf node 240 of the hierarchical schema 202 can correspond to the leaf node 220 of the hierarchical schema 200. The second field mapping can define two-way correspondences between leaf nodes of the hierarchical schema 200 and leaf nodes of the hierarchical schema 204. For example, the leaf node 220 of the hierarchical schema 200 can correspond to a leaf node 242 of the hierarchical schema 204, and the leaf node 242 of the hierarchical schema 204 can correspond to the leaf node 220 of the hierarchical schema 200.

In some examples, the semantic correspondences are provided as two-way semantic correspondences. Referring again to FIGS. 2A-2C, and by way of non-limiting example, a first semantic correspondence between the hierarchical schemas 200, 202 and a second semantic correspondence between the hierarchical schemas 200, 204 can be provided. The first semantic correspondence can define two-way correspondences between the intermediate nodes of the hierarchical schema 200 and the intermediate nodes of the hierarchical schema 202. The second semantic correspondence can define two-way correspondences between intermediate nodes of the hierarchical schema 200 and intermediate nodes of the hierarchical schema 204. For example, the intermediate node 210 of the hierarchical schema 200 can correspond to an intermediate node 246 of the hierarchical schema 204, and the intermediate node 246 of the hierarchical schema 204 can correspond to the intermediate node 210 of the hierarchical schema 200.

As discussed in further detail herein, generation of the CHS is based on merging of the hierarchical schemas in view of the provided field mappings and semantic correspondences. During the merging process, nodes of the multiple hierarchical schemas are merged to provide merged nodes. In some examples, a merged node is provided as an equivalence class of corresponding properties and can be denoted as $X \subseteq P$. An equivalence relation can be derived and can be denoted as $E \subseteq P \subseteq P$. The equivalence relation can completely contain the field mappings M and the semantic correspondences C, as well as tuples to establish reflexivity, symmetry and transitivity. Accordingly, a merged graph can be provided and can include merged nodes and edges between the merged nodes.

FIG. 3 depicts an example merged graph 300 based on the example hierarchical schemas 200, 202, 204 of FIGS. 2A-2C. Each node in the merged graph 300 is provided as a merged node and thus, an equivalence class. In generating the merged graph 300, an edge is provided between a pair of merged nodes (e.g., $([p_1], [p_2])$) if and only if some node contained in the first merged node in the pair is a parent of some node contained in the second merged node in the pair (i.e., if $p_1$=parent($p_2$)). In the example of FIG. 3, a merged node 302 is provided as a merger of the root nodes of each of the hierarchical schemas 200, 202, 204. As another example, a merged node 304 can be provided as a merger of the intermediate nodes 214, 218 of the hierarchical schema 200 (see FIG. 2A), an intermediate node 250 of the hierarchical schema 202 (see FIG. 2B), and an intermediate node 252 of the hierarchical schema 204 (see FIG. 2C). In some examples, one of the contained properties (p) labels the merged node. For example, in the example depicted in FIG. 3, the label "Customer" of the merged node 304 can be determined from the labels of the intermediate nodes 214, 218, 250, 252. In some examples, linguistic processes can be implemented to generate labels for the merged nodes.

In some implementations, a merged graph is provided as a cyclic graph. Consequently, the merged graph can include unacceptable cycles. The example merged graph 300 of FIG. 3 is a cyclic graph that includes cycles. Considering merged nodes 304, 306, 308, 310, 312 of FIG. 3, an example cycle is provided as Telecom→Customer→Telecom→Seller→Address→City, which, although each pair of path components is provided in the hierarchical schema, is not intuitive. In some examples, unintuitive cycles can occur if an equivalence class groups information of different granularities. For example, Seller in the path PO→Seller from the hierarchical schema 204 groups seller address and telecom information, whereas Seller in PO→Telecom→Seller from the hierarchical schema 200 only bundles telecom information. In some examples, unintuitive cycles can occur if an equivalence class groups information from different branches of the same schema. For example, address nodes 246, 260 in the hierarchical schema 204 (see FIG. 2C) bundle address information. Because the address nodes 246, 260 are merged into the single address node 310 of the merged graph 300, buyer and seller paths cannot be correctly distinguished.

To remove cycles, equivalence classes (i.e., merged nodes) can be split into a set of merged nodes by removing problematic tuples. Using the notation provided above, a problematic tuple $(p_1, p_2)$ can be removed from an equivalence class E. To achieve this, only two properties $p_1$ and $p_2$ are accepted in a single merged node if all leaves reached from one property (e.g., $L_1=\{l_1 \in L | (l_1, p_1) \in \text{parent}^T\}$), whose corresponding leaves also exist in the schema of the second property (e.g., $L_2=\{l_2 | l_2 \sim_{68} l_1 \wedge l_1 \in L_1 \wedge [l_2]_S=[p_2]_S\}$), are also reached from the second property (e.g., $\forall l_2 \in L_2 : (l_2, p_2) \in \text{parent}^T$).

In some examples, an equivalence class can be provided as a complete, undirected graph. Every edge of the equivalence class can represent simultaneously a forward and a backward edge. The equivalence class is denoted by $G=(V, \epsilon)$, where each element of the equivalence class is a node (i.e., $V=[p_1]_\epsilon$). As every element corresponds to every other element in the equivalence class, the corresponding graph is complete. That means, the graph containsan edge between every pair of nodes (i.e., $\epsilon=[p_1]_\epsilon \times [p_1]_E$). Edges between unacceptable pairs of properties are removed to provide a reduced graph, where a clique of a reduced graph can be provided as a complete sub-graph. In some examples, a clique is maximal, if and only if, there is no larger clique having the same nodes. The maximal cliques of the reduced graph each includes nodes that can be merged without creating a conflict. Consequently, each maximal clique is provided as a merged node.

Figure 4B:
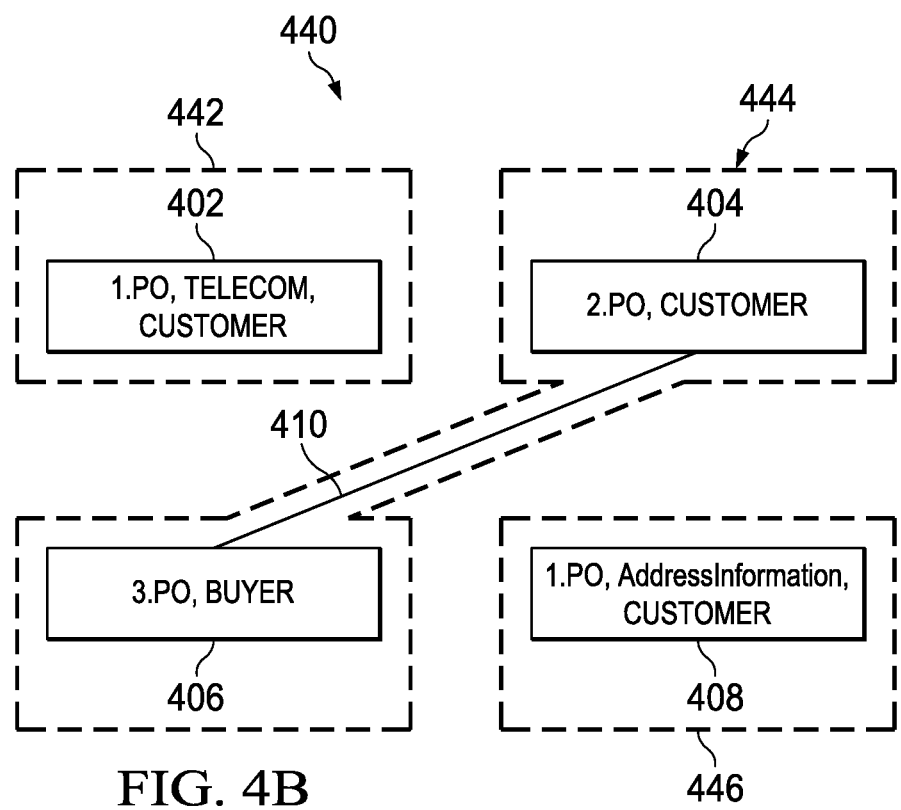

FIGS. 4A and 4B depicts example splitting of an equivalence class. FIG. 4A depicts an example graph 400 representing an example equivalence class that corresponds to the merged node 304 of FIG. 3. In the example graph 400, nodes 402, 404, 406, 408 and edges 410, 412, 414, 416, 418, 420 are provided. The nodes 402, 408 correspond to the intermediate nodes 214, 218 of the hierarchical schema 200 of FIG. 2A, the node 404 corresponds to the intermediate node 250 of the hierarchical schema 202 of FIG. 2B, and the node 406 corresponds to the intermediate node 252 of the hierarchical schema 204 of FIG. 2C. The graph 400 is complete because an edge exists between every pair of nodes. Edges between problematic pairs of nodes are removed to provide a reduced graph 440, depicted in FIG. 4B. The reduced graph 440 includes maximal cliques 442, 444, 446, each maximal clique representing a merged node. In the depicted example, the maximal clique 442 includes only the node 402, the maximal clique 444 includes the nodes 404, 406 and the edge 410, and the maximal clique 446 includes only the node 408.

In some implementations, computing the merged nodes from an equivalence class (i.e., splitting an equivalence class that has problematic tuples). Example pseudo-code for computing the merged nodes can be provided as:

```
ϵ = [p]_E × [p]_E
G = ([p]_E, ϵ)
For every p_1 ∈ [p]_E do:
    For every p_2 ∈ [p]_E \ {p_1} do:
        // find leaves reached by p_1
        For every l_1 = {l_1 ∈ L |(l_1,p_1) ∈ parent^T} do:
            // determine corresponding leaves in other schema
            For every l_2 ∈ [p_2], ∩ [l_1]_E do:
                // check whether the leaf is reached by p_2
                If (l_2,p_2) ∉ parent^T then:
                    Assert (p_1,p_2) ∉ ϵ and implicitly (p_2,p_1) ∉ ϵ
Return maximalCliques(G)
```

As a prerequisite, a transitive relation $\text{parent}^T$ is relied on and can be obtained from the function parent, discussed above. The example pseudo-code starts from the complete graph (i.e., $G=([p]_E, [p]_E \times [p]_E)$), and iterates over all pairs of properties checking the granularity requirement. In each iteration, conflicting edges are removed from the graph. When all conflicting edges are removed, the merged nodes (i.e., maximal cliques) are computed from the graph.

Figure 5:
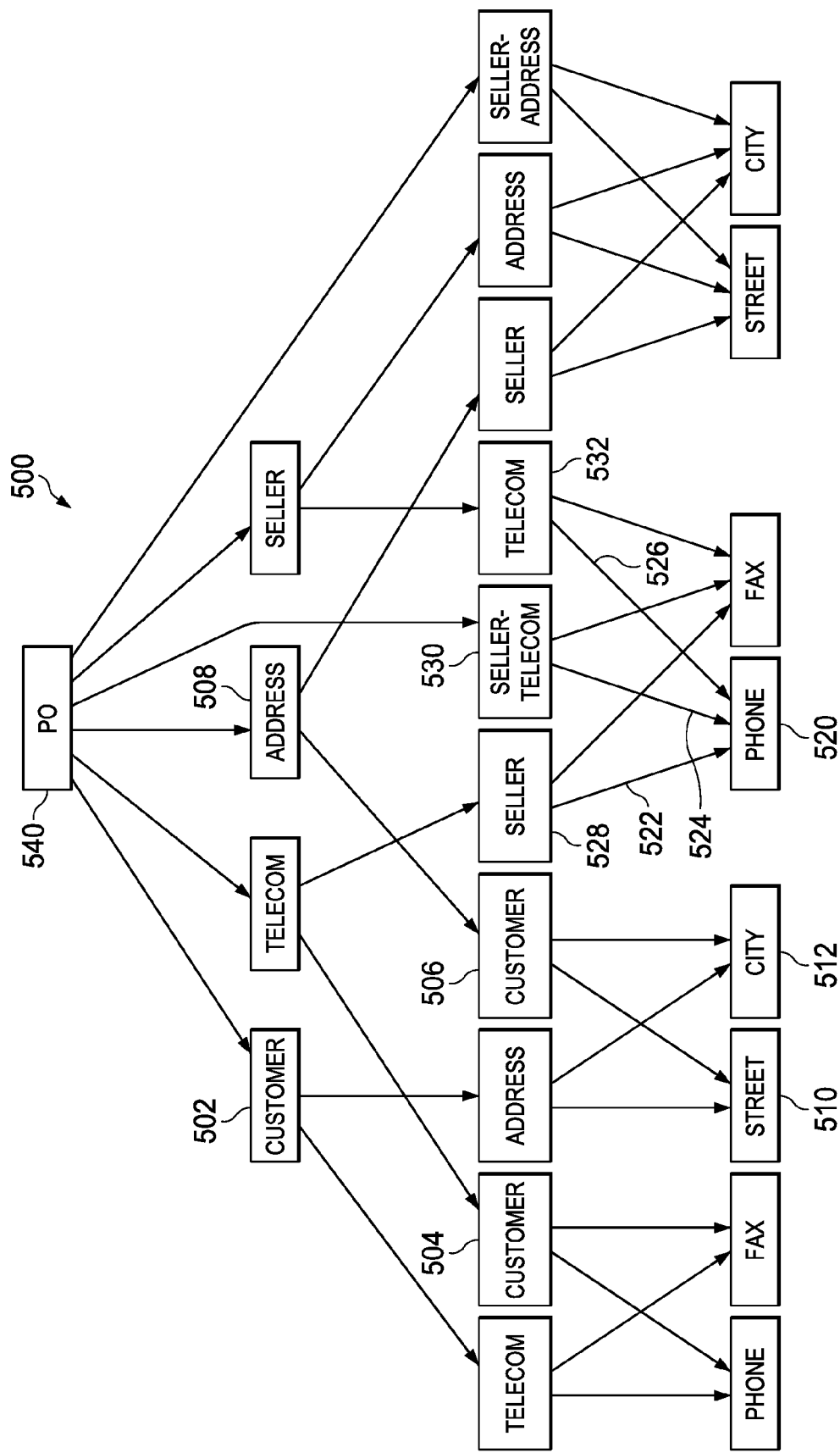
FIG. 5 depicts an example conflict-free merged graph.

FIG. 5 depicts an example conflict-free merged graph 500. The conflict-free merged graph 500 corresponds to the merged graph 300 of FIG. 3, where merged nodes having problematic tuples have been split. In some examples, the conflict-free merged graph 500 is provided as an acyclic graph. As a consequence of splitting, original equivalence classes appear multiple times. In this manner, alternative structures are provided, while excluding unintuitive structures. In some examples, the same label is kept for all merged nodes that result from one equivalence class to provide for harmonic labeling in schemas generated from the conflict-free merged graph. In the example of FIG. 5, and with reference to FIG. 4B, the intermediate node 502 corresponds to the maximal clique 444 (i.e., the merger of nodes 404, 406), the intermediate node 504 corresponds to the maximal clique 442 (i.e., the single node 402), and the intermediate node 506 corresponds to the maximal clique 446 (i.e., the single node 408).

The conflict-free merged graph can be processed to generate one or more MHSs. As noted above, the conflict-free merged graph describes alternative structures, while excluding unintuitive structures. Some alternative structures can be interdependent. By way of non-limiting example, and with reference to FIG. 5, the node 502 (PO/Customer) cannot be in the same structure as a node 508 (PO/Address), because both of the nodes 502, 508 are grandparent nodes (i.e., parents of parents) with respect to leaf nodes 510, 512 (i.e., customer street and city fields, respectively).

To handle such interdependencies, a constraints satisfaction problem (CSP) can be provided, which can be solved using CSP problem solving that combines heuristics and combinatorial search. In some examples, a CSP consists of variables and constraints. Each variable has a finite domain, and each constraint describes the dependencies between values of particular variables. In accordance with implementations of the present disclosure, one variable $(px_1)$ is used per merged node, indicating the desired parent, where $X_1$ is the set of properties in the merged node. The domain of $px_1$ contains every merged node that contains any transitive parent of $X_1$, and can be denoted as:

$$Dom(px_1)=\{\sigma\} \cup \{X_2 | X_2 \exists p \wedge p = \text{parent}^T(x_1) \wedge x_1 \in X_1\}$$

where $\sigma$ is a special value that is defined as $\sigma \notin P$, and that indicates omission of a node any parental edge of that node. $\sigma$ is added only to the domain of internal merged nodes. Further, transitive parents are used to generate MHSs that omit less frequently used structures.

Each solution to the CSP can be provided as an MRS. Each MHS can include a tree structure in view of the archetype of the conflict-free merged graph extended by the transitive edges with some edges and nodes removed. In some examples, a MHS is not bound to the exact structures of one source hierarchical schema (e.g., the hierarchical schemas 200, 202, 204 of FIGS. 2A-2C), and can instead mix features of the source hierarchical schemas.

To generate an MHS from the conflict-free merged graph, edges and nodes of the conflict-free merged graph are removed. An example set of constraints defines the removal of exclusive edges, where leaf nodes of the conflict-free merged graph determine exclusivity. All edges in a set of edges (e.g., $\{e_1, e_2, \ldots\}$, where $e_1=(X_1, X_2)$, $e_2=(X_1, X_3), \ldots$, and $X_2 \neq X_3 \neq \ldots$) that potentially reach the same leaf node are exclusive. By way of non-limiting example, and with reference to FIG. 5, a leaf node 520 can be considered, which includes inbound edges 522, 524, 526 from intermediate nodes 528, 530, 532, respectively. The edge 540-502 is exclusive from the edge 540-508 because both 502 and 508 eventually reach leaf 510. Exclusive edges can be identified by iterating over every merged node and every merged leaf node, while consulting the previously calculated transitive relation parent$^T$. The following example pseudo-code can be provided:

---

For every merged node $X_1$ do:
    For every leaf equivalence class $[l_1]_E \in L/\sim_\epsilon$ assert:
        $\{X_2 | x_2 \in X_2 \wedge l_2 \in [l_1]_E \wedge (l_2, x_2) \in parent^T \wedge parent(x_2) \in X_1\}$
        are exclusive.

---

In some examples, being exclusive means that only one of the edges may appear in an MHS. Consequently, for each computed set of exclusive children of $X_1$ (i.e., $\{X_{2.1}, X_{2.2}, \ldots\}$), a maximum occurrence constraint is added to the CSP. In some examples, the maximum occurrence constraint, indicates that a child node can have only one parent node (i.e., each child node can have only one inbound edge). The maximum occurrence constraint can be evaluated as $|\{l \in \{X_{2.1}, X_{2.2}, \ldots\} | p_i = X_1\}| \leq 1$, where i is an index used to evaluate the maximum occurrence constraint in view of the set of nodes $\{X_{2.1}, X_{2.2}, \ldots\}$.

In some implementations, other sets of constraints can be provided and can define the connectivity of the MHS tree structure to ensure that full paths are preserved. In some examples, a set of constraints can be provided to propagate edges, implicitly propagating node usage. For example, for every edge (i.e., connecting merged nodes $(X_1, X_2)$), a constraint can be added to the CSP. In some examples, the constraint can be denoted as $(\exists X_2 : p_{x_2} = X_1) \leftrightarrow p_{x_1} \neq \sigma$. In some examples, a set of constraints can ensure that no adjacent edges are kept for an unused node. That is, a merged node (e.g., $X_1$) has no parent node if and only if no edge (i.e., connecting merged nodes $(X_1, X_2)$) is kept. Accordingly, the constraint that, for every unused node, edges should be removed, can be added to the CSP. In some examples, the constraint can be denoted as $(\nexists X_2 : p_{x_2} = X_1) \leftrightarrow p_{x_1} = \sigma$ for every edge $(X_1, X_2)$.

The exclusivity and connectivity constraints jointly fulfill the rationale to construct intuitive MHSs. Accordingly, if an MHS contains a specific structure, the structure should be used completely. Therefore, if a merged node appears in the MHS, appropriate edges also appear in the MHS. In this manner, all potentially reachable leaf nodes are actually reached by the merged node and vice versa.

Figure 6A:
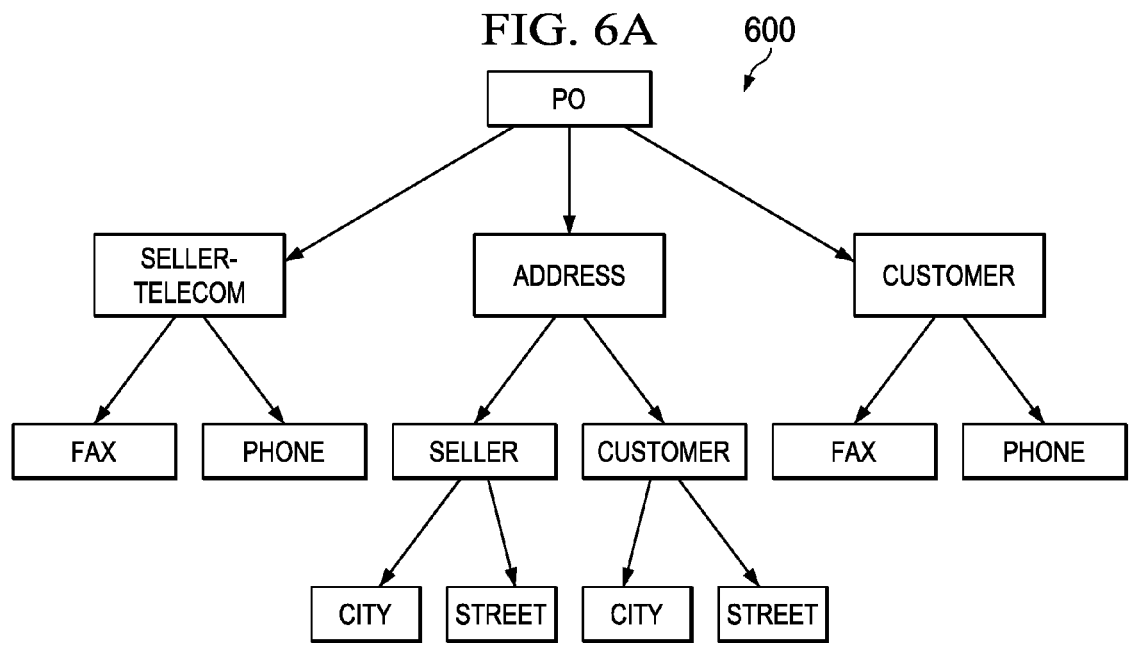
FIGS. 6A and 6B depict example mediated hierarchical schemas (MHSs).
Figure 6B:
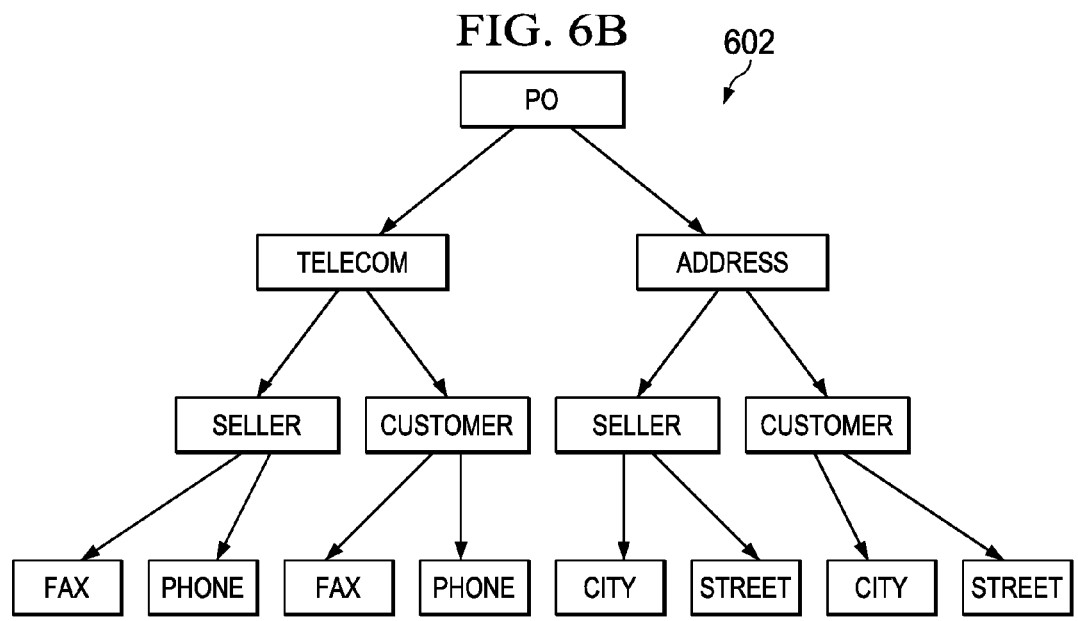

FIGS. 6A and 6B depict example MHSs 600, 602, respectively. Each of the MHSs 600, 602 is provided as a solution to the CSP that is generated in view of the conflict-free merged graph 500 of FIG. 5. That is, each MHS 600, 602 is consistent with the structure of the conflict-free merged graph and is allowed by the constraints set forth in the CSP.

The CHS is determined based on the MHSs. In some implementations, a set of MHSs is provided and includes a plurality of MHSs. The CHS is provided as an optimal MHS of the set of MHSs. In some examples, optimality can be defined based on the amount of structural commonalties with the source hierarchical schemas. To quantify this, how frequently the properties in a merged node are used in practice can be determined. For that purpose, the field mappings in which each property is referenced can be counted. Counting can start from the uses of a leaf node of the conflict-free merged graph, where uses of a leaf node $l_1$ can be denoted as:

$$uses(l_1)=|\{l_1|(l_1,l_2) \in MV(l_3,l_1) \in M\}|$$

Counting can continue using the internal properties p of the conflict-free merged graph MHS. An internal property of a schema is used as often as all reachable leaf nodes together, and can be denoted as:

$$uses(p)=\Sigma_{l \in L \wedge (l,p) \in parent^T} uses(l)$$

In some examples, internal property usages can be aggregated for each merged node of the conflict-free merged graph. Aggregation of the usages can be denoted as:

$$uses(X) \Sigma_{p \in X} uses(p)$$

In this manner, how often each merged node is referenced in all mappings can be determined.

In some implementations, scaling is provided to compare the relative importance of different merged nodes. In some examples, the number of absolute uses of a merged node (i.e., uses(X)) is compared to a maximum possible number of uses, which can be provided as:

$$maxUses(X)=\Sigma_{x \in X \wedge (l_2,x) \in parent^T \wedge l_2 \in L \wedge l_2 - El_2} uses(l_2)$$

For example, a merged node could have potentially been used in all the mappings in which the equivalents of the reachable leaves are involved.

A use frequency can be determined for each merged node in the conflict-free merged graph. In some examples, the frequency is provided as a normed use based on the following example relationship:

$$freq(X) = \frac{uses(X)}{maxUses(X)}$$

By way of non-limiting example, and with reference to a sub-set of merged nodes provided in FIG. 5, the actual uses, potential uses (maximum possible uses) and the frequency for the root node can be provided as 64, 64 and 100%, respectively, can be provided as 8, 16 and 50%, respectively, for the intermediate node 506, can be provided as 8, 16 and 50%, respectively, for the intermediate node 528, and can be provided as 4, 16 and 25%, respectively, for the intermediate node 530. It is appreciated that a frequency can be provided for each of the intermediate nodes and the root node in the conflict-free merged graph.

In some implementations, a CHS maximizes the sum of merged node frequencies, while some nodes may be removed. Node removal may be due to exclusivity with a more frequent alternative or due to infrequency of the node itself. To cater for infrequency of a node itself, the frequency of a merged node below a threshold $\theta$, for example $\theta=50\%$, is not considered and is instead counted as 0%. A relevant frequency for each merged node can be provided as:

$$rfreq(X) = \begin{cases} freq(X), & freq(X) \geq \theta \\ 0, & otherwise \end{cases}$$

In accordance with the present disclosure, the CSP is provided as an optimization problem by a floating point variable (m) to be maximized. In some examples, the value of m is calculated for each MHS as the sum of the relevant frequencies of the merged nodes that are kept (i.e., from the conflict-free merged graph) in the particular MHS. An indicative variable ($\hat{h}_x$) can be provided with domain $\{0,1\}$ for each merged node X. The indicative variable keeps track of whether a node is used. Accordingly, the value is calculated by the constraints $p_x \neq \sigma \leftrightarrow \hat{h}_x = 1$ and $p_x = \sigma \leftrightarrow \hat{h}_x = 0$. The constraint for the optimization variable computing the average usage can be provided using the following example relationship:

$$m = \frac{\Sigma_X \hat{k}_x rfreq(X)}{|\{X \mid \hat{k}_x = 1\}|}$$

The optimal solution of the CSP is a MHS that may contain infrequent merged nodes. Removing the infrequent nodes and joining the dangling edges results in the CHS containing only the most common structure of the given hierarchical schemas. With reference to FIGS. 6A and 6B, the MHS 602 of FIG. 6B can be determined to be the optimal solution to the CSP based on the conflict-free merged graph 500 of FIG. 5.

Figure 7:
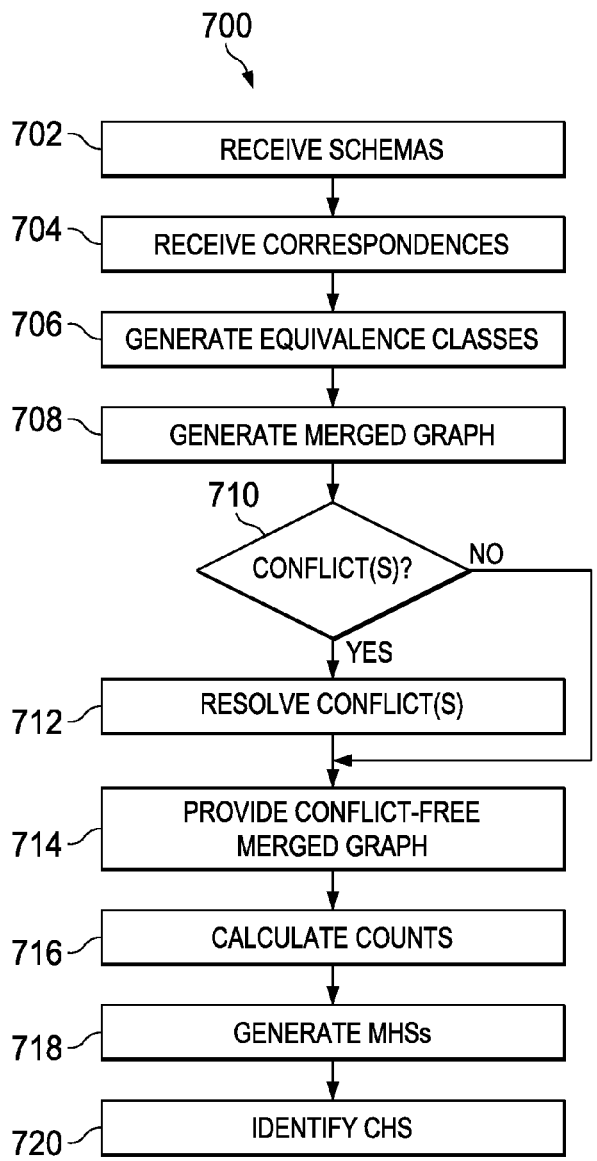
FIG. 7 depicts an example process that can be executed in implementations of the present disclosure.

Referring now to FIG. 7, an example process 700 can be executed in implementations of the present disclosure. In some examples, the process 700 can be provided in one or more computer programs executed using one or more computing devices.

A plurality of hierarchical schemas is received (702). In some examples, each hierarchical schema can be provided as an electronic document that is received from computer-readable memory. In some examples, each hierarchical schema can be deemed to be a source hierarchical schema. A plurality of field mappings and semantic correspondences are received (704). In some examples, each hierarchical schema can be provided as an electronic document that is received from computer-readable memory. In some example, each field mapping defines two-way correspondences between leaf nodes of a plurality of the hierarchical schemas. In some example, each semantic correspondence defines two-way correspondences between intermediate nodes of a plurality of the hierarchical schemas.

Equivalence classes are generated (706). In some examples, and as discussed in detail above, each equivalence class can include one or more nodes of each of the hierarchical schemas, which one or more nodes can define a merged node. A merged graph is generated. In some examples, and as discussed in detail above, the merged graph includes the equivalence classes provided as merged nodes and edges between the merged nodes. It is determined whether one or more conflicts exist in the merged graph (710). In some examples, a conflict exists if an equivalence class (i.e., a merged node) includes problematic tuples.

If it is determined that one or more conflicts exist in the merged graph, the conflicts are resolved (712), and a conflict-free merged graph is provided (714). In some examples, and as discussed in detail above, a conflict is resolved by splitting of an equivalence class into a plurality of merged nodes, each merged node defining a maximal clique. If it is determined that conflicts do not exist in the merged graph, the conflict-free merged graph is provided (714). Counts for each merged node are determined (716). More specifically, the counts can include the actual uses, potential uses, the frequency and the relevant frequency. As discussed above, the actual uses, potential uses, the frequency and the relevant frequency can be determined for each non-leaf merged node of the conflict-free merged graph. In some examples, the actual uses, potential uses, the frequency and the relevant frequency are determined based on the provided field mappings and semantic correspondences. In some examples, a floating point variable is determined for each MHS, and the MHS having the highest value for the floating point variable is identified as the optimum MHS and, thus, the CHS. In some example, the floating point variable is determined based on the counts for the non-leaf nodes provided in each MHS, the counts being provided from the conflict-free merged graph.

Multiple MHSs are generated (718). In some examples, and as discussed above, a CSP is generated and constraints for the CSP are defined. Each MHS is generated as a potential solution to the CSP. In some examples, each MHS is generated by removing unused nodes and exclusive edges from the conflict-free merged graph based on the constraints. A CHS is identified (720). For example, and as discussed in detail above, the CHS is selected as one of the multiple MHSs. In some examples, the optimum MHS is identified and the CHS is provided as the optimum CHS.

For business intelligence, instance data from different computing systems inside one company have to be analyzed at once. The different computing systems store their data in different schemas. Computing the overarching schema (CHS) is a prerequisite to provide a unified list of the instances from all systems to be analyzed at once.

Figure 8A:
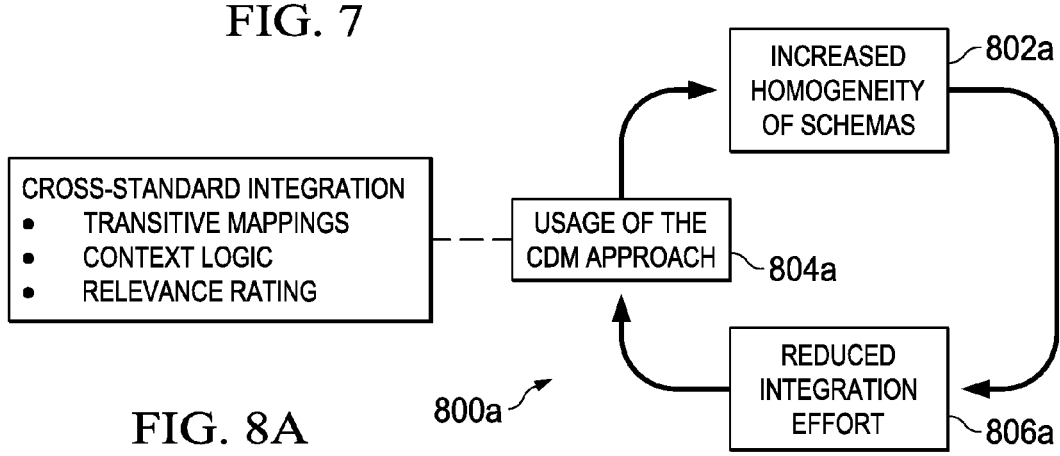
FIGS. 8A and 8B are a block diagrams illustrating an example methods 800a and 800b, respectively, for maintaining an evolving CDM according to an implementation.
Figure 8B:
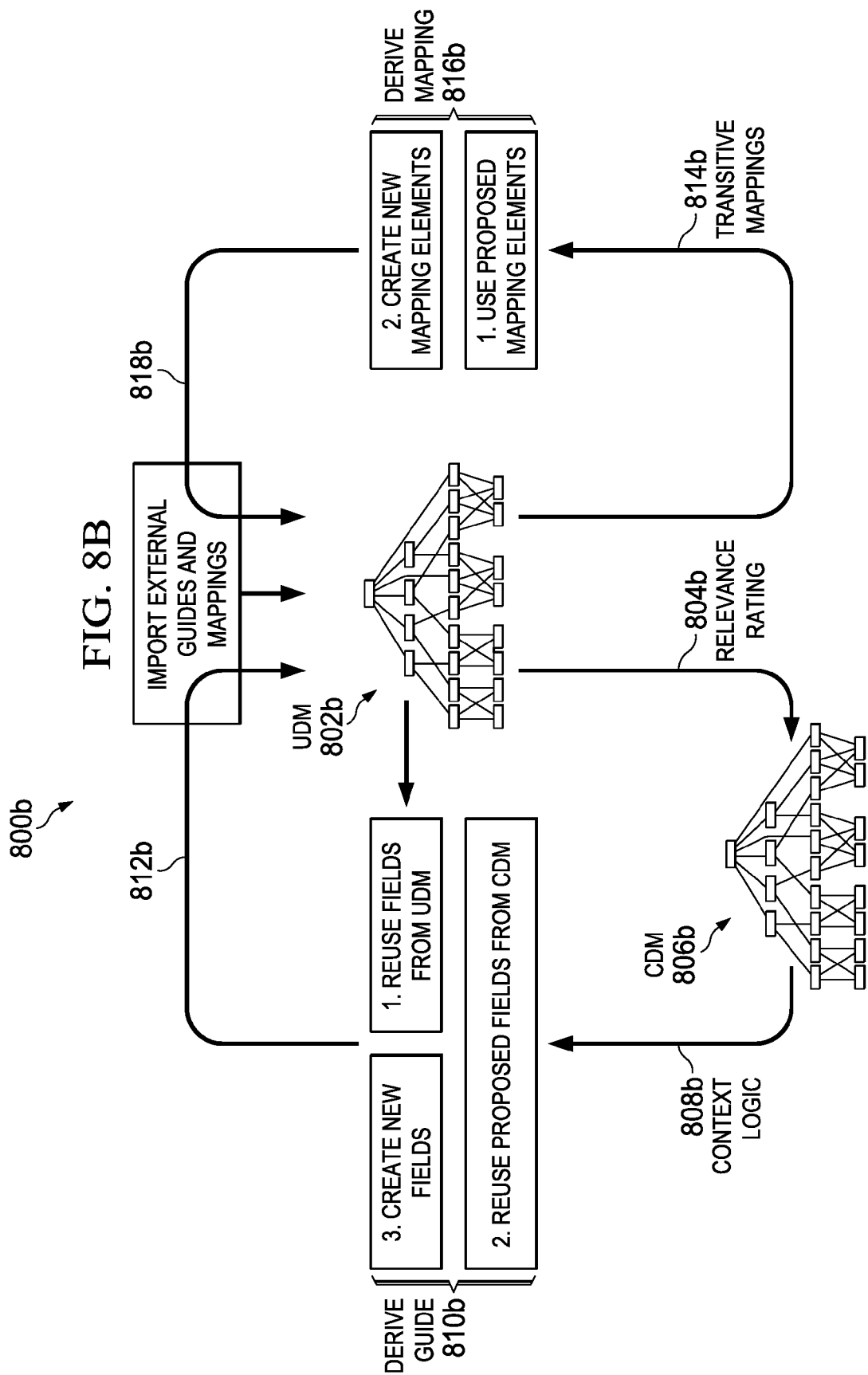

A Canonical Data Model for Iterative Effort Reduction in Business-to-Business Schema Integration FIGS. 8A and 8B are a block diagrams illustrating an example methods 800a and 800b, respectively, for maintaining an evolving CDM according to an implementation. One of the main problems in business-to-business (B2B) integration is the great overhead in B2B message templates. Companies that want to exchange messages need to customize a standard message template. These templates are published by standardization organizations, e.g. the United Nations Centre for Trade Facilitation and Electronic Business (UN/CEFACT) and/or others. The templates may contain thousands of data fields trying to reflect all the business needs of one industry domain or even across industries. For the creation of a new message (or "message guide") only a small number of data fields from the standard template may be used. Creating a message guide means customizing the standard template: 1) redundant data fields have to be discarded and 2) missing data fields have to be added. This is typically a manual process and is both time consuming and error prone requiring a lot of effort. Another issue can be different semantic understandings or the misuse of a particular data field, for example business partners might use the same syntactical field for different purposes. Additionally, market leaders might choose to ignore given template structures and force partners/industry to adapt to their particular interpretation/implementation. Over the last decades, a great number of various electronic data interchange (EDI) standards have emerged. Standardization organizations have tried to cover industry domain-specific requirements on the one hand, as well as industry-independent demands on the other hand. Furthermore, if companies need to support various standards, integration costs increase even more. For each standard, software has to be adapted or additional modules need to be purchased. A step towards the reduction of the standard heterogeneity is the creation of subsets for different industries within one standard. However, in this case, the same compatibility problems mentioned above occur as well—business partners might not use the identical subset or misuse fields.

In a case where two business partners wish to exchange messages using different standards or subsets of standards, a mapping between these messages is required. The mapping maps each field of a source message to a corresponding field of a target message guide. Creating a message mapping between two standards is also a time consuming process requiring a lot of effort. Companies often hire consultants to create these mappings because expert knowledge of the involved standards is required. Consultants can be expensive and the required cost can reduce available information technology budgets for the companies. This section of the disclosure describes a precise and commonly understandable lingua franca (i.e., a "bridge language") with consistent and semantically unambiguous meaning of structure and elements. The approach incorporates a CDM as the most common structure/single view of data for multi-enterprises, enterprises, divisions, or processes and can be independently used by any system or partner. The approach also covers cross-domain as well as cross-standard communication and is not focused heavily on the mapping task which, due to heterogeneity of schemas, leads to high mapping costs. The approach maintains an evolving CDM which consolidates the current knowledge of the correspondences of existing schemas.

As can be seen in FIG. 8A, the approach aims to increase homogeneity of schemas 802a by iteratively applying the knowledge in the CDM 804a to reduce the integration/mapping effort 806a and, therefore, high mapping costs.

The effort reduction in the approach is produced by consideration/usage of the following features, which become possible through use of the CDM, and which each address a key challenge in contemporary B2B integration:
1. Relevance Rating—since existing all-purpose-standards are underspecified and too broad, the approach supports identifying relevant fields for a new message guide.
2. Context Logic—since requirements greatly vary from business domain to domain, the approach analyzes and proposes best practices for specific business domains.
3. Transitive Mappings—as a pivotal point, the CDM relates all schemas to each other and thus knowledge of transitive mappings is inherent.
4. Cross-Standard Integration—the CDM inherently combines the features of a plethora of smaller, domain-specific standards, which currently make it difficult to enter new business areas across multiple domains.
5. Iterative Improvement—by knowing and proposing fields productively used by other companies, the CDM facilitates reuse of existing schema structures. With that, the CDM iteratively reduces heterogeneity of the schemas and with that also the mapping effort.

By using the CDM in combination with the features above, the approach has two appealing properties:
1. Effort Reduction—every participant realizes an effort reduction.
2. Flexibility—companies are not forced to a given standard. Instead, the approach provides guidance and allows deviating where necessary. The negative effects of the flexibility are absorbed by the relevance rating and transitive mapping.

The approach is dependent on reuse for proper functionality; an exposure of a single instance to many users is necessary and increases value/effectiveness, while an increased number of instances reduce effectiveness. In some implementations, the most natural deployment structure is as a publicly-available cloud-computing-based service.

Turning now to FIG. 8B, the UDM 802b is a central, unifying model of all message guides and mappings known to the system. The UDM 802b can be generated from the guides and mappings as described above and is, in some implementations, a conflict-free merged graph without the computed transitive edges as shown above in FIG. 5. To further clarify, when the relevance rating 804b (described in more detail below) is applied to the UDM 802b, the result is the CDM 806b, which, in some implementations, is similar to or the same as the CHS as described above.

In some implementations, the UDM 802b is initially empty. As indicated in FIG. 8B, external guides and mappings can be constantly imported. This information is used to build the initial UDM 802b. The UDM 802b unifies all data fields from all message guides in the system. Every node in the UDM 802b is the unique representation of the semantically equivalent data fields from the different message guides.

Deriving a New Message Guide

The UDM 802b supports a user in deriving a new message guide based on the condensed knowledge in the system (as can be seen in the left side of FIG. 8B). As a first step, a relevance rating 804b (described in more detail below) is applied to the UDM 802b to identify the most frequently used data fields in the UDM. These are stored as the CDM 806b.

The CDM 806b is presented as an enterprise application pattern that provides an additional level of indirection between application's individual data formats and as an approach to join different message guides to tackle the challenges of B2B integration. The CDM 806b correlates existing guides, for example the two purchase orders as illustrated above in FIG. 4, based on knowledge of existing, productive mappings. The aim is to capture the structures of the different message guides in a single graph, as the one shown in FIG. 5. Conflicting structures of message guides must be addressed as described above. The CDM 806b is also not completely shown to a user. As can be seen at the bottom of FIG. 5, the data fields are referenced by multiple internal nodes. The multiple references to one leaf are exclusive alternatives for the superior structure. Choosing one alternative structure for one leaf may imply the same structure for another leaf. A set of compatible alternatives is the structure of a possible message guide that can be shown to the user. Which exclusive structuring alternative is chosen is determined by relevance rating 804b and context logic 808b depending on the specific request of the user as described above.

In contrast to the UDM 802b, which is only active in the backend, the CDM 806b is characteristic of the approach and the main user-interaction component. From the CDM 806b, a domain-specific CDM view 810b is created by applying context logic 808b (described in more detail below) tailored to the specific business context of a user. The domain-specific CDM view is used as the base for deriving a new message guide 812b.

For every data field, the user has three options when deriving a message guide:
1. Reuse Proposed Fields from CDM—with generating the proposal for a new guide based on the domain-specific CDM, chance increase that many of them are appropriate for the new guide.
2. Reuse Fields from UDM—in case a user's requirements are not fully covered by the CDM 806b proposal, additional fields can be taken from the UDM 802b into the new guide. This means that fields used by others productively can be reused in the new guide.
3. Create New Fields—if a desired field is neither contained in the CDM 806b nor in the UDM 802b, the user has the possibility to create a new field in his guide proposal. With this flexibility, the chance to misuse existing fields is decreased.

The newly derived message guides are again stored within the UDM 802b. Every field of the new guide that was taken from the CDM 806b or UDM 802b is implicitly assigned to the semantics of the respective UDM 802b node.

Deriving a Mapping Proposal

Similar to the message guide derivation, it is also possible to derive a mapping proposal 816b between two message guides based on the UDM 802b (as depicted on the right side of FIG. 8B) by using transitive mappings 814b (described in more detail below). A mapping element is an assignment between one source and one target field. Although many-to-many relations can be represented with a mapping relation, more complex operations like value transformations and database lookups may need to be developed by technicians at a point somewhere in the process. For each mapping element, the user has the following options:

1. Use Proposed Mapping Elements—for every pair of fields that are unified in the same UDM 802b node, the system proposes a mapping element for connecting these fields.
2. Create New Mapping Elements—in case a mapping element is incorrect or a desired mapping element is not proposed, the user can manually create new mapping elements.

Again, newly derived mappings 818b are stored in the UDM 802b by assigning both the source and the target field to the same semantically unique UDM node. By this technique, mapping elements are implicitly transitively combined.

In the approach, the aspect of cross-standard integration does not only apply to the proposal of mapping elements, but also to the derivation of the message guide. If a user decides to reuse fields stemming from initially distinct B2B standards, a standard-compliant message implementation message guide cannot be generated. Rather, the approach would export a new message guide, which internally is stored like all message guides as a generic hierarchical schema, for example as a new XML Schema. With that, the approach leaves the path of classical B2B standards which force companies to a fixed structure and set of data fields. The task of the iterative generation of a CDM containing the common core of the domain-specific best practices is to keep the heterogeneity low which could otherwise be a result of the new flexibility. As a CDM is built in a context-agnostic manner in the iterative approach, companies focus on best practice(s) not only with their current, direct business partners, but within a domain and worldwide, which increases the ability for future integration.

Figure 9:
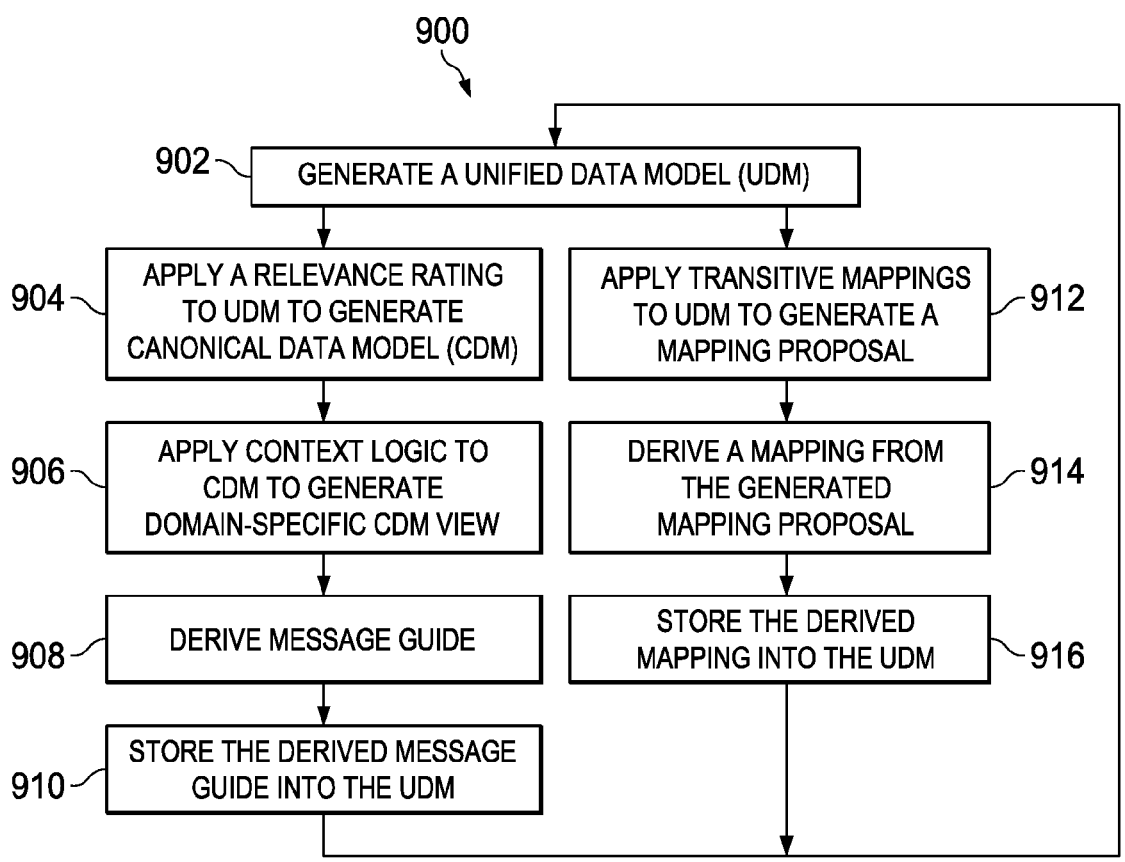
FIG. 9 is a flow chart illustrating a method for maintaining an evolving CDM according to an implementation.

FIG. 9 is a flow chart illustrating an example method 900 for maintaining an evolving CDM according to an implementation. For clarity of presentation, the description that follows generally describes method 900 in the context of FIGS. 1, 2A-2C, 3, 4A-4B, 5, 6A-6B, 7, and 8A-8B. However, it will be understood that method 900 may be performed, for example, by any other suitable system, environment, software, and hardware, or a combination of systems, environments, software, and hardware as appropriate. In some implementations, various steps of method 900 can be run in parallel, in combination, in loops, or in any order.

At 902, a UDM is generated from the guides and mappings as described above and is, in some implementations, a conflict-free merged graph without the computed transitive edges as shown above in FIG. 5. From 902, method 900 proceeds to 904 to derive a new message guide OR from 902, method 900 proceeds to 912 to derive a mapping proposal.

Derive a New Message Guide

At 904, a relevance rating is applied to the UDM. The task of the relevance rating is to tackle the great overhead in B2B standards and the implied message guide creation effort by proposing a message guide that contains only frequently used data fields and structures that represents the best practice among the productively used message guides in the system. Here, the CDM is not required to be a tree that is an archetype of a hierarchical schema., rather it is permissible for the CDM to contain alternatives. For that, the above-described exclusivity constraint is removed from the above-described constraint satisfaction problem.

In order to get rid of the infrequent nodes, a frequency threshold is defined. In a simple example, the guides $G_1=\{a_1, e_1\}$, $G_2=\{a_1, b_1, d_1\}$, $G_3=\{a_1, b_1, c_1\}$ would, after applying a threshold of say 50%, only contribute the fields $\{a_1, b_1\}$ to the generated CDM. This proposal represents the most frequently used guide from a best practice and is, in some implementations, similar to or the same as the CHS as described above. From 904, method 900 proceeds to 906.

At 906, context logic is applied to the CDM to generate a domain-specific CDM view. As previously stated, domain-specific requirements strongly increase a message guide creation effort. By applying context logic, the effort is intended to be reduced. Context logic leverages the effect that certain fields are used in certain, but not all, business domains. Examples of business domains could be automotive in Germany or finance in the United States.

The approach used the idea of a context driver principle. Here, business context is organized in context categories. Possible categories could include, for example, "geopolitical", with possible values such as Germany and United States, "industry domain" with, for example, automotive and finance, and "business process" with, for example, purchasing, ordering, and billing. The categories and the possible values are typically already established and/or in common use.

When importing an external message guide, the business context in which the message guide is relevant needs to be given as a further parameter in the approach. In the UDM, the given business context is assigned to every node of the imported message guide. A business context consists of multiple values per context category. When a user requests a message guide, the desired business context has to be defined as an additional parameter. The generated CDM is an "excerpt" from the UDM. To answer a user request, all nodes are kept from the CDM that have at least one value in one category that was requested by the user. With that, a CDM proposal is generated for the user which combines the different features of the existing message guides that were already used in similar business contexts. For example, given the guide $G_1=\{a_1, b_1, c_1\}$ for finance in Germany, $G_2=\{c_1, d_1\}$ for the automotive industry in the United States, and $G_3=\{a_1, d_1\}$ for the insurance area in Germany, then a request for the finance and automotive in Germany would produce the proposal: $\{a_1, b_1, c_1, d_1\}$.

For the actual CDM generation it must be ensured, in addition to excerpting the correct context, that the resulting CDM proposal is a tree. Therefore, the computation defined as a constraint satisfaction problem and described above is reapplied on the excerpted CDM, this time with the originally described constraints. By first applying the relevance rating and then afterwards restricting business context, usage of frequently used nodes is fostered to reduce heterogeneity among new message guides. From 906, method 900 proceeds to 908.

At 908, a message guide is derived. From 908, method 900 proceeds to 910.

At 910, the derived message guide is stored into the UDM. When storing the derived guide in the UDM, the business context requested by the user is added to all nodes used in the derived message guide. With that, the UDM has always updated knowledge about the usage of data fields in the business contexts, which will provide valuable input for the next request. From 910, method 900 proceeds back to 902.

Derive a Mapping

At 902, transitive mappings are applied to UDM to generate a mapping proposal. By using transitive effects, a mapping effort can also be reduced. If there exists three message guides $G_1=\{a_1, b_1\}$, $G_2=\{a_2, b_2\}$ and $G_3=\{a_3, b_3\}$ with mappings between $(G_1, G_2)$ and $(G_1, G_3)$, a mapping between $(G_2, G_3)$ can easily be derived.

In the approach, the knowledge about correspondences between the message guides is constantly integrated by assigning all message guides' fields to UDM nodes. In particular, correspondence knowledge is reused when reusing CDM or UDM nodes during message guide creation and when mapping two data fields to each other. When proposing a message guide, we can propose a mixture of data fields from different standards and business domains to fit the requirements of the user. When proposing mapping elements, we implicitly combine the existing mappings transitively. These proposals have a high value as they base on mappings created by humans.

The usage of transitive knowledge, however, is not always straight-forward; conflicting structures and misuse of fields have to be handled. The issue concerning conflicting structures can be observed above in FIG. 4 (e.g., Telecom and Seller are differently nested in both message guides and simply merging the graphs would result in cycles implying unnatural structures and combinations of features that did not exist in any of the original message guides).

The misuse of data fields leads to a similar situation. If a message guide $G_1=\{a_1, b_1\}$ is mapped normally on $G_2=\{a_2, b_2\}$ and $G_3=\{a_3, b_3\}$, but $G_2$ is mapped on $G_3$ in a way that the mapping elements are $(a_2, b_3)$ and $(b_2, a_3)$, then through transitive combination, $a_1$ is eventually related to $b_1$. That is obviously wrong because one message guide cannot contain two data fields with the same semantics. Therefore, we detect cycles that would lead to joining two nodes of the same message guide and avoid the merger.

However, internally, both graphs are maintained. The first is the graph of merged nodes that may contain cycles and conflicts. Assigning the data fields of the message guides to the nodes of that graph allows keeping the transitive mapping information. The second graph is a conflict-free version where some nodes of the message guides are not merged in order to avoid the conflicts. That graph is necessary to store the allowed structuring alternatives of the message guides and to serve as a semantically sound, unambiguous representation of the joint structure. From 912, method 900 proceeds to 914.

At 914 a mapping is derived from the generated mapping proposal. From 914, method 900 proceeds to 916.

At 916, the derived mapping is stored into the UDM. From 916, method 900 proceeds back to 902.

The main purpose of the UDM is to reduce the uncontrolled growth of heterogeneity that leads to an increased mapping effort by the misuse of fields of the introduction of proprietary standards. By proposing data fields from the CDM to be used in a new desired message guide, the user is tempted to pick the data fields from CDM or UDM. That means that immediately after storing the new message guide, mappings to most of the other message guides in the repository can be proposed.

On the one hand, the approach does not force a company to a fixed set of data fields like in the traditional standards approach. On the other hand, the approach guides the community to align around a central set of frequently used data fields. In that sense, the approach can be seen also as a standardization approach. In contrast to traditional approaches, in the approach, the decision about the common, important data fields is guided by the users on a per-use basis and not so much by a separate standardization team or organization. Additionally, the approach allows for deviations from the recommendation, but only collects those peculiarities in the standard, which become commonly adopted in the community.

In addition to its main purpose, the CDM also amplifies the effect of the relevance rating, context driver, and the transitive mappings implicitly. Relevance rating and the context driver principle work of course within one standard. All data fields that are used in message guides from one standard can be analyzed and the most frequent ones be presented when a new message guide should be created in that standard. However, across standards, there may be differences even in the same domain about the importance of specific data fields. By integrating the message guides in a cross-standard manner, the calculated frequencies reflect more realistically the actual behaviour of people. Finally, the CDM makes the best features of various standards available for use in a new message guide. Also the transitive combination of knowledge is more effective the more connections are already known in a system. Therefore, the UDM can be expected to boost the transitive effects.

Figure 10:
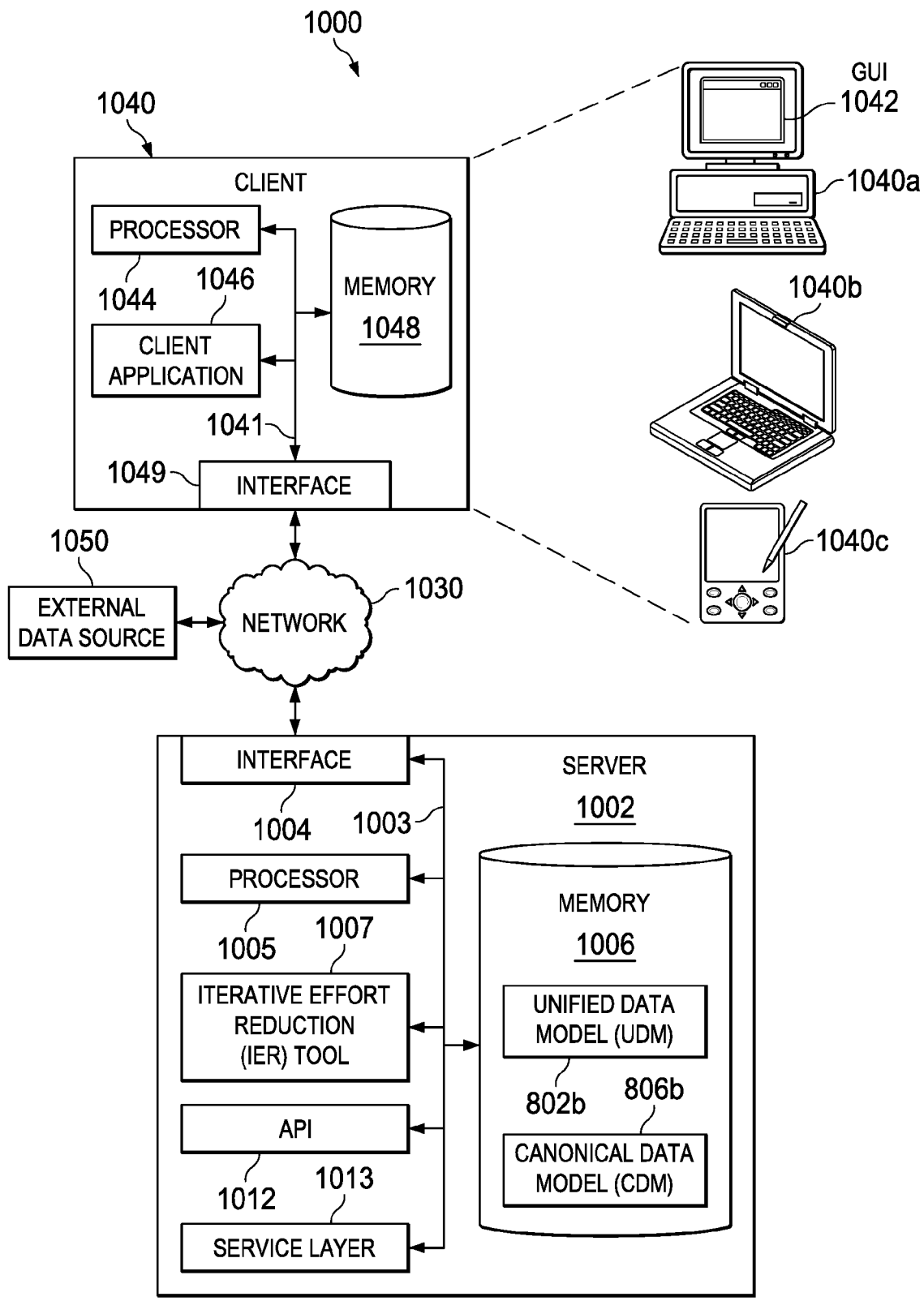
FIG. 10 is a block diagram illustrating an example distributed computing system for maintaining an evolving canonical data model (CDM) according to an implementation.

FIG. 10 is a block diagram illustrating an example distributed computing system (EDCS) 1000 for maintaining an evolving CDM according to an implementation. The EDCS 1000 can be used for the operations described in association with the implementations described herein. The illustrated EDCS 1000 includes or is communicatively coupled with a server 1002 and a client 1040 that communicate across a network 1030 and an external data source 1050. At a high level, the server 1002 is an electronic computing device operable to receive, transmit, process, store, or manage data and information associated with the EDCS 1000. According to some implementations, server 1002 may also include or be communicably coupled with an e-mail server, a web server, a caching server, a streaming data server, a business intelligence (BI) server, and/or other suitable server. The following described computer-implemented methods, computer-readable media, computer systems, and components of the example distributed computer system 1000 provide maintenance of an evolving CDM.

In general, the server 1002 is a server that stores and/or executes an iterative effort reduction (IER) tool 1007. The server 1002 can also interact with user requests/responses sent by clients 1040 within and communicably coupled to the illustrated EDCS 1000. In some implementations, the IER tool 1007 represents one or more web-based applications accessed and executed by the client 1040 using the network 1030 or directly at the server 1002 to perform the programmed tasks or operations of a particular IER tool 1007.

The server 1002 is responsible for receiving requests using the network 1030, for example requests to maintain an evolving CDM and/or any other suitable requests from one or more client applications 1046 associated with the client 1040 of the EDCS 1000 and responding to the received requests by processing said requests in the IER tool 1007. In addition to requests from the client 1040, requests may also be sent to the server 1002 from internal users, external or third-parties, other automated applications, as well as any other appropriate entities, individuals, systems, or computers. In some implementations, requests/responses can be sent directly to server 1002 from a user accessing server 1002 directly.

Each of the components of server 102, for example, 1005, 1006, 1007, etc., using a system-type bus 103. In some implementations, any and/or all components of the server 1002, both hardware and/or software, may interface with each other and/or the interface over the system bus 103 using an application programming interface (API) 1012 and/or a service layer 1013. The API 1012 may include specifications for routines, data structures, and object classes. The API 1012 may be either computer-language independent or dependent and refer to a complete interface, a single function, or even a set of APIs. The service layer 1013 provides software services to the EDCS 1000. The functionality of the server 1002 may be accessible for all service consumers using this service layer. Software services, such as those provided by the service layer 1013, provide reusable, defined business functionalities through a defined interface. For example, the interface may be software written in JAVA, C++, or other suitable language providing data in extensible markup language (XML) format or other suitable format.

While illustrated as an integrated component of the server 1002 in the EDCS 1000, alternative implementations may illustrate the API 1012 and/or the service layer 1013 as stand-alone components in relation to other components of the EDCS 1000. Moreover, any or all parts of the API 1012 and/or the service layer 1013 may be implemented as child or sub-modules of another software module, enterprise application, or hardware module without departing from the scope of this disclosure. For example, the API 1012 could be integrated into the IER tool 1007.

The server 1002 includes an interface 1004. Although illustrated as a single interface 1004 in FIG. 10, two or more interfaces 1004 may be used according to particular needs, desires, or particular implementations of the EDCS 1000. The interface 1004 is used by the server 1002 for communicating with other systems in a distributed environment—including within the EDCS 1000—connected to the network 1030; for example, the client 1040 and/or external data source 1050 as well as other systems communicably coupled to the network 1030. Generally, the interface 1004 comprises logic encoded in software and/or hardware in a suitable combination and operable to communicate with the network 1030. More specifically, the interface 1004 may comprise software supporting one or more communication protocols associated with communications such that the network 1030 or interface's hardware is operable to communicate physical signals within and outside of the illustrated EDCS 1000.

The server 1002 includes a processor 1005. Although illustrated as a single processor 1005 in FIG. 10, two or more processors may be used according to particular needs, desires, or particular implementations of the EDCS 1000. Generally, the processor 1005 executes instructions and manipulates data to perform the operations of the server 1002. Specifically, the processor 1005 executes the functionality required to maintain an evolving canonical data model (CDM).

The server 1002 also includes a memory 1006 that holds data for the server 1002, client 1040, and/or other components of the EDCS 1000. Although illustrated as a single memory 1006 in FIG. 10, two or more memories may be used according to particular needs, desires, or particular implementations of the EDCS 1000. While memory 1006 is illustrated as an integral component of the server 1002, in alternative implementations, memory 1006 can be external to the server 1002 and/or the EDCS 1000. In some implementations, the memory 1006 includes one or more persistent instances of a UDM 802*b* (as described above), a CDM 806*b* (as described above), and/or any data necessary, persistent and/or temporary, for the operation of the IER tool 1007.

The UDM 802*b*, CDM 804*b*, and/or or other data associated with memory 1001 can be generated, stored, and/or converted from/into any suitable format or form, for example, binary, text, numerical, a database file, a flat file, or the like. In some implementations, the UDM 802*b*, CDM 804*b*, and/or or other data can directly accessed by any suitable component of the EDCS 1000, for example, the IER tool 1007. In some implementations, the UDM 802*b*, CDM 804*b*, and/or or other data may be updated regularly or at a particular time based on underlying processes and/or data/content objects. While the UDM 802*b* and CDM 804*b* are illustrated as an integral component of the memory 1006, in alternative implementations, the UDM 802*b*, CDM 804*b* can be external to the memory 1006 (e.g., stored in memory 1048) and/or be separated into both internal/external UDM 802*b*, CDM 804*b*, and/or or other data as long as accessible using network 1030.

The IER tool 1007 is an application/service that, among other things, can provide functionality for maintaining an evolving CDM, including applying a relevance rating 804*b* to a UDM 802*b* to generate the evolving CDM, applying context logic 808*b* to the CDM 806*b* to generate a domain-dependent CDM view 810*b*, deriving a message guide 812*b*, from the domain-dependent CDM view 810*b*, and storing the derived message guide 812*b* into the UDM 802*b*. The IER tool 1007 can also apply transitive mappings 814*b* to the UDM 802*b* to derive a mapping proposal 816*b*, derive a mapping 818*b* from the mapping proposal 816*b*, and store the derived mapping 818*b* into the UDM 802*b*.

In some implementations, the IER tool 1007 can also send messages, emails, SMS/MMS/and equivalent text messages, make telephone calls, raise alerts/alarms, and/or other appropriate notification actions. For example, upon an error condition, the IER tool 1007 can notify system administrators and/or users. The IER tool 1007 can also allow the client 1040 to request, view, execute, create, edit, delete, and/or consume server 1002 content, including accessing the UDM 802*b*, the CDM 806*b*, the domain-specific CDM view 810*b*, proposed mappings 816*b*, derived mappings 818*b*, and the like.

Once a particular IER tool 1007 is launched, the particular IER tool 1007 can be used, for example by a client 1040, to interactively process a task, event, or other information/content associated with the server 1002. In some implementations, the IER tool 1007 may be a network-based, web-based, and/or other suitable application consistent with this disclosure. For example, a particular IER tool 1007 may receive a request (a desired user action) from a client 1040 browser derive a message guide/mapping.

In some implementations, a particular IER tool 1007 may operate in response to and in connection with at least one request received from other IER tool 1007, other components (e.g., software and/or hardware modules) associated with another server 1002, and/or other components of the EDCS 1000 (whether illustrated or not). In some implementations, the IER tool 1007 can be accessed and executed in a cloud-based computing environment using the network 1030. In some implementations, a portion of a particular IER tool 1007 may be a web service associated with the IER tool 1007 that is remotely called, while another portion of the IER tool 1007 may be an interface object or agent bundled for processing at a remote client 1040. Moreover, any or all of a particular IER tool 1007 may be a child or sub-module of another software module or enterprise application (not illustrated) without departing from the scope of this disclosure. Still further, portions of the particular IER tool 1007 may be executed or accessed by a user working directly at the server 1002, as well as remotely at a corresponding client 1040. In some implementations, the server 1002 or any suitable component of server 1002 or the EDCS 1000 can execute the IER tool 1007.

The client 1040 (e.g., 1040a-1040c) may be any computing device operable to connect to or communicate with at least the server 1002 using the network 1030. In general, the client 1040 comprises an electronic computing device operable to receive, transmit, process, and store any appropriate data associated with the EDCS 1000, for example, the IER tool 1007, GUIs, utilities/tools, and the like. More particularly, among other things, the client 1040 can generate CDM maintenance requests with respect to the server 1002. The client typically includes a processor 1044, a client application 1046, a memory 1048, and/or an interface 1049 interfacing over a system bus 141.

The client application 1046 is any type of application that allows the client 1040 to navigate to/from, request, view, create, edit, delete, administer, and/or manipulate content associated with the server 1002. In some implementations, the client application 1046 can be and/or include a web browser. In some implementations, the client application 1046 can use parameters, metadata, and other information received at launch to access a particular set of data from the server 1002 and/or other components of the EDCS 1000. Once a particular client application 1046 is launched, a user may interactively process a task, event, or other information associated with the server 1002 and/or other components of the EDCS 1000. For example, the client application 1046 can generate and transmit a CDM maintenance request to the server 1002. Further, although illustrated as a single client application 1046, the client application 1046 may be implemented as multiple client applications in the client 1040.

The interface 1049 is used by the client 1040 for communicating with other computing systems in a distributed computing system environment, including within the EDCS 1000, using network 1030. For example, the client 1040 uses the interface to communicate with the server 1002 as well as other systems (not illustrated) that can be communicably coupled to the network 1030. The interface 1049 may be consistent with the above-described interface 1004 of the server 1002 or other interfaces within the EDCS 1000. The processor 1044 may be consistent with the above-described processor 1005 of the server 1002 or other processors within the EDCS 1000. Specifically, the processor 1044 executes instructions and manipulates data to perform the operations of the client 1040, including the functionality required to send requests to the server 1002 and to receive and process responses from the server 1002.

The memory 1048 typically stores objects and/or data associated with the purposes of the client 1040 but may also be consistent with the above-described memory 1006 of the server 1002 or other memories within the EDCS 1000 and be used to store data similar to that stored in the other memories of the EDCS 1000 for purposes such as backup, caching, and the like.

Further, the illustrated client 1040 includes a GUI 1042 that interfaces with at least a portion of the EDCS 1000 for any suitable purpose. For example, the GUI 1042 may be used to view data associated with the client 1040, the server 1002, or any other component of the EDCS 1000. In particular, In some implementations, the client application 1046 may act as a GUI interface for the IER tool 1007, other components of server 1002, and/or other components of the EDCS 1000 (whether illustrated or not). In the case of requesting maintenance of a CDM, the GUI 1042 can be used, in some implementations, to format, save, edit, and/or transmit API 1012 calls to the server 1002 in order to maintain a CDM and/or other functionality. For example, an server 1002 user can generate JAVA (or other suitable computing language) API 1012 calls to the IER tool 1007 to maintain CDM 1018.

There may be any number of clients 1040 associated with, or external to, the EDCS 1000. For example, while the illustrated EDCS 1000 includes one client 1040 communicably coupled to the server 1002 using network 1030, alternative implementations of the EDCS 1000 may include any number of clients 1040 suitable to the purposes of the EDCS 1000. Additionally, there may also be one or more additional clients 1040 external to the illustrated portion of the EDCS 1000 that are capable of interacting with the EDCS 1000 using the network 1030. Further, the term "client" and "user" may be used interchangeably as appropriate without departing from the scope of this disclosure. Moreover, while the client 1040 is described in terms of being used by a single user, this disclosure contemplates that many users may use one computer, or that one user may use multiple computers.

The illustrated client 1040 (example configurations illustrated as 1040a-1040c) is intended to encompass any computing device such as a desktop computer, laptop/notebook computer, wireless data port, smart phone, personal data assistant (PDA), tablet computing device, one or more processors within these devices, or any other suitable processing device. For example, the client 1040 may comprise a computer that includes an input device, such as a keypad, touch screen, or other device that can accept user information, and an output device that conveys information associated with the operation of the server 1002 or the client 1040 itself, including digital data, visual and/or audio information, or a GUI 1042, as shown with respect to the client 1040.

The external data source 1050 is includes external message guides and mappings that are imported into the EDCS 100. In some implementations, data received from the external data source 1050 can be generated, stored, and/or converted from/into any suitable format or form, for example, binary, text, numerical, a database file, a flat file, or the like. In some implementations, data from the external data source can be updated regularly or at a particular time by a manual and/or automated process.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU, including single-thread or multi-threaded CPUs. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI)

that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an GS, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
receiving the plurality of source hierarchical schemas, each source hierarchical schema being stored as a computer-readable document in computer-readable memory;
processing, using a computer, the source hierarchical schemas to generate a merged graph, the merged graph comprising a plurality of merged nodes, each merged node being provided based on one or more nodes from at least two of the source hierarchical schemas;
determining, using the computer, that the merged graph includes one or more conflicts and, in response, resolving each conflict of the one or more conflicts to generate a computed-transitive-edge-free, conflict-free merged graph as a unified data model (UDM), wherein resolving comprises splitting one or more merged nodes into respective sub-sets of merged nodes; and
continuously maintaining the UDM by:
generating a mapping proposal for data fields of two or more message guides by applying transitive mappings to the UDM using cycles and conflicts of the merged graph with data field assignments from the two or more message guides to preserve transitive mapping information and a conflict-free graph with one or more non-merged nodes of the two or more message guides to provide semantically sound, unambiguous structuring alternatives for a new message guide; and
deriving a mapping for the data fields from the generated mapping proposal.

2. The computer-implemented method of claim 1, comprising generating a canonical data model (CDM) by applying a relevance rating based on a received context in a user request to the nodes of the UDM.

3. The computer-implemented method of claim 2, wherein the generated CDM is an excerpt from the UDM with nodes containing at least one value consistent with the received context.

4. The computer-implemented method of claim 3, wherein the CDM is used as a bridge language with consistent and semantically unambiguous meaning of data structures and data elements used by two or more interfacing software applications executing on different computing systems.

5. The computer-implemented method of claim 2, comprising applying context logic to the CDM to generate a domain-specific CDM view.

6. The computer-implemented method of claim 5, comprising deriving the message guide from the domain-specific CDM view.

7. The computer-implemented method of claim 6, comprising storing the derived message guide into the UDM.

8. The computer-implemented method of claim 1, comprising storing the derived mapping into the UDM.

9. A non-transitory, computer-readable medium storing one or more computer-readable instructions executable by a computer and operable to:
    receive the plurality of source hierarchical schemas, each source hierarchical schema being stored as a computer-readable document in computer-readable memory;
    process the source hierarchical schemas to generate a merged graph, the merged graph comprising a plurality of merged nodes, each merged node being provided based on one or more nodes from at least two of the source hierarchical schemas;
    determine that the merged graph includes one or more conflicts and, in response, resolving each conflict of the one or more conflicts to generate a computed-transitive-edge-free, conflict-free merged graph as a unified data model (UDM), wherein resolving comprises splitting one or more merged nodes into respective sub-sets of merged nodes; and
    continuously maintain the UDM by one or more operations to:
        generate a mapping proposal for data fields of two or more message guides by applying transitive mappings to the UDM using cycles and conflicts of the merged graph with data field assignments from the two or more message guides to preserve transitive mapping information and a conflict-free graph with one or more non-merged nodes of the two or more message guides to provide semantically sound, unambiguous structuring alternatives for a new message guide; and
        derive a mapping for the data fields from the generated mapping proposal.

10. The non-transitory, computer-readable medium of claim 9, operable to generate a canonical data model (CDM) by applying a relevance rating based on a received context in a user request to the nodes of the UDM.

11. The non-transitory, computer-readable medium of claim 10, wherein the generated CDM is an excerpt from the UDM with nodes containing at least one value consistent with the received context.

12. The non-transitory, computer-readable medium of claim 11, wherein the CDM is used as a bridge language with consistent and semantically unambiguous meaning of data structures and data elements used by two or more interfacing software applications executing on different computing systems.

13. The non-transitory, computer-readable medium of claim 10, operable to apply context logic to the CDM to generate a domain-specific CDM view.

14. The non-transitory, computer-readable medium of claim 13, operable to derive the message guide from the domain-specific CDM view.

15. The non-transitory, computer-readable medium of claim 14, operable to store the derived message guide into the UDM.

16. The non-transitory, computer-readable medium of claim 9, operable to store the derived mapping into the UDM.

17. A computer-implemented system, comprising:
    a computer memory configured to contain a unified data model (UDM);
    at least one computer interoperably coupled with the computer memory and configured to:
        receive the plurality of source hierarchical schemas, each source hierarchical schema being stored as a computer-readable document in computer-readable memory;
        process the source hierarchical schemas to generate a merged graph, the merged graph comprising a plurality of merged nodes, each merged node being provided based on one or more nodes from at least two of the source hierarchical schemas;
        determine that the merged graph includes one or more conflicts and, in response, resolving each conflict of the one or more conflicts to generate a computed-transitive-edge-free, conflict-free merged graph as a unified data model (UDM), wherein resolving comprises splitting one or more merged nodes into respective sub-sets of merged nodes; and
        continuously maintain the UDM by one or more configurations to:
            generate a mapping proposal for data fields of two or more message guides by applying transitive mappings to the UDM using cycles and conflicts of the merged graph with data field assignments from the two or more message guides to preserve transitive mapping information and a conflict-free graph with one or more non-merged nodes of the two or more message guides to provide semantically sound, unambiguous structuring alternatives for a new message guide; and
            derive a mapping for the data fields from the generated mapping proposal.

18. computer-implemented system of claim 17, configured to generate a canonical data model (CDM) by applying a relevance rating based on a received context in a user request to the nodes of the UDM.

19. The computer-implemented system of claim 18, wherein the generated CDM is an excerpt from the UDM with nodes containing at least one value consistent with the received context.

20. The computer-implemented system of claim 19, wherein the CDM is used as a bridge language with consistent and semantically unambiguous meaning of data structures and data elements used by two or more interfacing software applications executing on different computing systems.

21. The computer-implemented system of claim 18, configured to apply context logic to the CDM to generate a domain-specific CDM view.

22. The computer-implemented system of claim 21, configured to derive the message guide from the domain-specific CDM view.

23. The computer-implemented system of claim 22, configured to store the derived message guide into the UDM.

24. The computer-implemented system of claim 17, configured to store the derived mapping into the UDM.

\* \* \* \* \*